United States Patent
Miura et al.

(10) Patent No.: US 12,388,676 B2
(45) Date of Patent: Aug. 12, 2025

(54) DATA TRANSFER DEVICE, DATA PROCESSING DEVICE AND DATA PROCESSING METHOD

(71) Applicant: Nippon Telegraph and Telephone Corporation, Tokyo (JP)

(72) Inventors: Naoki Miura, Tokyo (JP); Takeshi Sakamoto, Tokyo (JP); Yuki Arikawa, Tokyo (JP); Tsuyoshi Ito, Tokyo (JP); Kenji Tanaka, Tokyo (JP); Masaru Katayama, Tokyo (JP); Yuta Ukon, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/703,996

(22) PCT Filed: Nov. 8, 2022

(86) PCT No.: PCT/JP2022/041564
§ 371 (c)(1),
(2) Date: Apr. 23, 2024

(87) PCT Pub. No.: WO2023/085270
PCT Pub. Date: May 19, 2023

(65) Prior Publication Data
US 2024/0430131 A1 Dec. 26, 2024

(30) Foreign Application Priority Data
Nov. 12, 2021 (JP) .................. 2021-184727

(51) Int. Cl.
*H04L 12/413* (2006.01)
*H04L 45/021* (2022.01)
(Continued)

(52) U.S. Cl.
CPC .......... *H04L 12/413* (2013.01); *H04L 45/021* (2013.01); *H04L 45/306* (2013.01); *H04L 49/9057* (2013.01); *H04L 2212/00* (2013.01)

(58) Field of Classification Search
CPC ................ H04L 12/413; H04L 45/021; H04L 45/306; H04L 49/9057; H04L 2212/00;
(Continued)

(56) References Cited

U.S. PATENT DOCUMENTS

2011/0113172 A1* 5/2011 Shieh .................... G06F 13/364
710/113

FOREIGN PATENT DOCUMENTS

JP 2016213586 A * 12/2016
WO WO-2018159677 A1 * 9/2018 ........... G06F 13/128

OTHER PUBLICATIONS

Halpern, J. et al., "Service Function Chaining (SFC) Architecture," Internet Engineering Task Force (IETF), Oct. 2015, 32 pages. As discussed in the specification.
(Continued)

*Primary Examiner* — Benjamin M Thieu
(74) *Attorney, Agent, or Firm* — Slater Matsil, LLP

(57) ABSTRACT

A data transfer device transfers a received packet. If the transfer destination of the received packet is a data processing device under control, the data transfer device (confirms the state of a shared bus, and if the shared bus is usable, transfers the packet to the data processing device of the transfer destination via the shared bus, gives the use right of the shared bus to one of the data processing devices in response to communication requirements from the data processing devices, and receives, via the shared bus, a packet from the data processing device given the use right.

14 Claims, 18 Drawing Sheets

(51) Int. Cl.
*H04L 45/302* (2022.01)
*H04L 49/9057* (2022.01)

(58) Field of Classification Search
CPC ..... H04L 12/40; H04L 45/0377; H04L 45/50; H04L 45/655
See application file for complete search history.

(56) References Cited

OTHER PUBLICATIONS

Quinn, P. et al., "Network Service Header (NSH)," Internet Engineering Task Force (IETF), Jan. 2018, 40 pages.
Ukon, Yuta et al., "Real-Time Image Processing Based on Service Function Chaining Using CPU-FPGA Architecture," IEICE Trans. Commun., vol. EI03-B. No. 1, Jan. 2020, 11-19 pages. As discussed in the specification.

\* cited by examiner

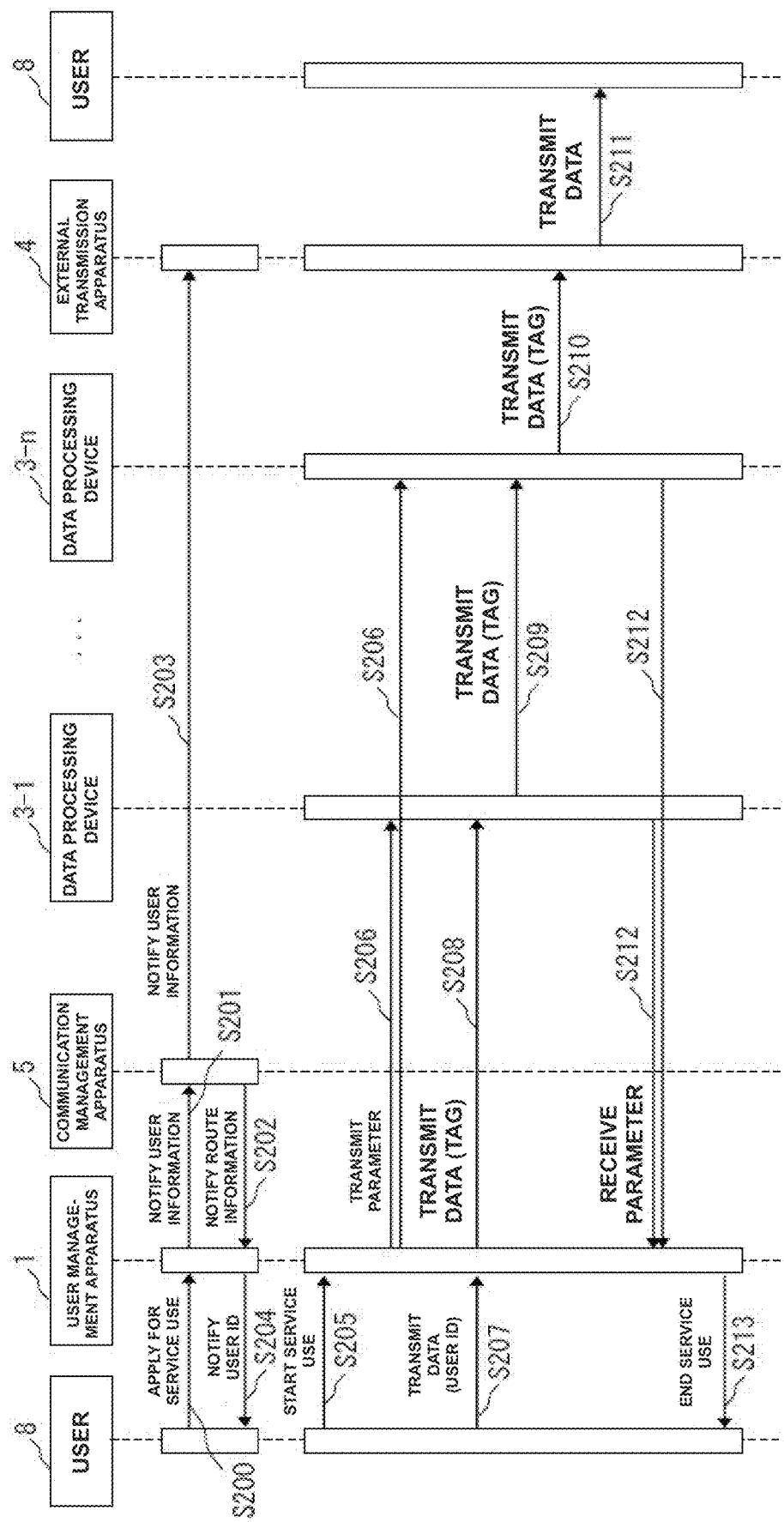

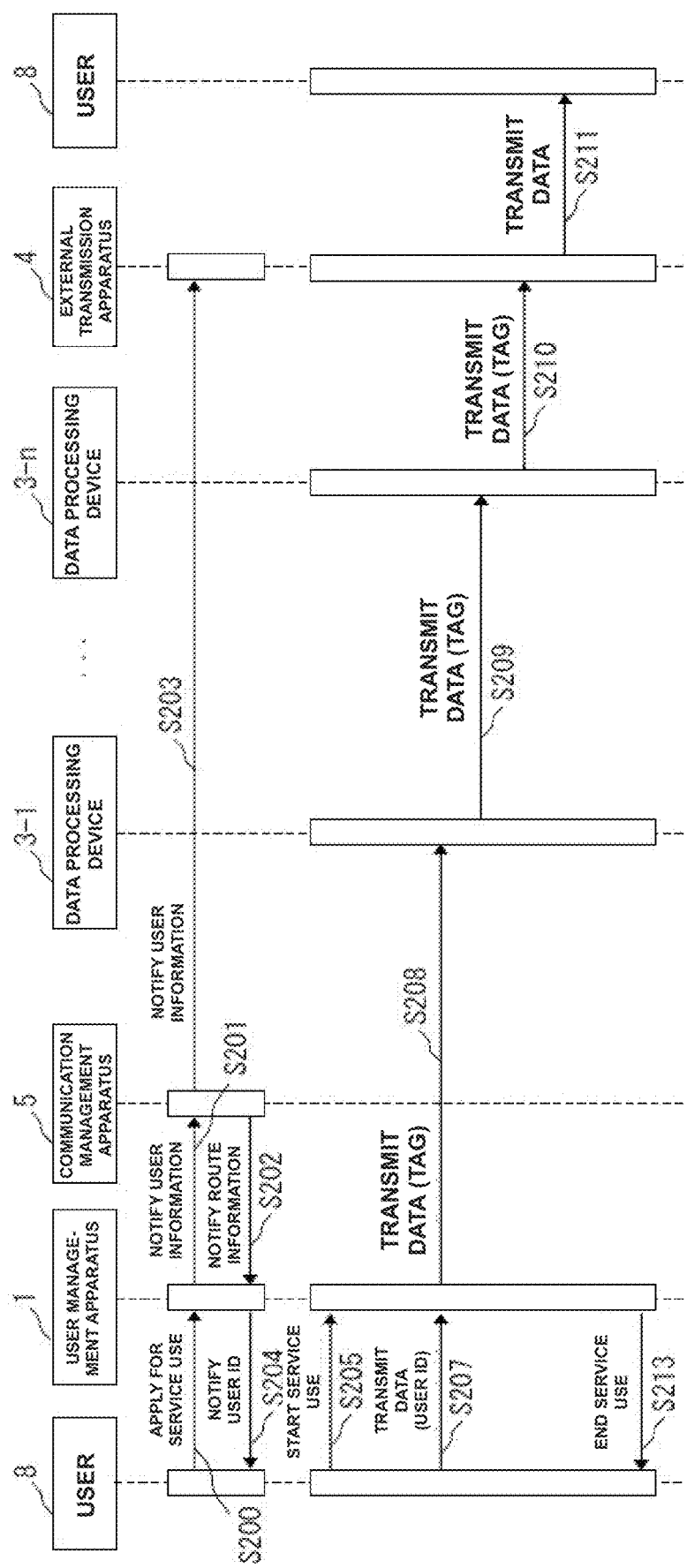

DATA TRANSFER DEVICE, DATA PROCESSING DEVICE AND DATA PROCESSING METHOD

CROSS-REFERENCE TO RELATED APPLICATIONS

This application is a national phase entry of PCT Application No. PCT/JP2022/041564, filed on Nov. 8, 2022, which claims priority to Japanese Patent Application No. 2021-184727, filed Nov. 12, 2021, which applications are hereby incorporated herein by reference.

TECHNICAL FIELD

The present invention relates to a data transfer device, a data processing device, and a data processing method in a data processing system that provides a service to a user by a service function chaining technique.

BACKGROUND

To flexibly provide an end-to-end service, Service Function Chaining (SFC) has been examined (non-patent literature 1). SFC is a technique of freely combining Service Functions (SF) scattered on a network, and it is possible to provide an optimum service for each user by using the SFC.

The SFC has been examined to implement a flexible network service, and this is a technique advantageous for a cloud service as well. For example, non-patent literature 2 discloses, as an image processing service using the SFC, a video monitoring service that combines two types of image processing functions.

In a network using the SFC, as shown in FIG. 15, a classifier 10 at the inlet adds a tag to a packet on a user basis, and a Service Function Forwarder (SFF) 11 transfers the packet to an appropriate SF based on the tag. In FIG. 15, reference numeral 12 denotes a server that implements an SF; and 13A and 13B, service chains in which SFs provided to each user are connected in a row. Using the SFC, a user can construct a unique service by combining SFs suitable for his/her purpose.

In the cloud service that requires processing with a low delay, the processing performance of the server 12 may pose a problem. To improve the processing performance of the server 12, as shown in FIG. 15, a Hardware Accelerator (HWA) 120 such as a Field-Programmable Gate Array (FPGA), a Graphics Processing Unit (GPU), or an Application Specific Integrated Circuit (ASIC) is used. In a system using the HWA 120, the HWA 120 is controlled using a Central Processing Unit (CPU) 121 in many cases. That is, serving as the main constituent, the CPU 121 transfers data to the HWA 120, and recovers the result when data processing is completed.

However, there also exist applications that do not need processing by the CPU 121. For example, in an image processing application configured to perform encoding, decoding, or size change of an image, processing can be performed only by the HWA 120. In such an application, the CPU 121 only controls the HWA 120, resulting in an increase of a processing delay in the system.

In a system that provides a cloud service, it is necessary to receive a data packet from the outside, reconstruct original data from the packet, and then perform processing. At this time, in the system using the HWA 120, data reconstruction at the application level and data transfer control between the CPU 121 and the HWA 120 are performed using the CPU 121.

For example, in a system shown in FIG. 16, packet processing is performed in a Network Interface Card (NIC) 122 of a host 12a, and data reconstruction and data transfer control between the CPU 121 and the HWA 120 (an FPGA board in the example shown in FIG. 16) are performed in a host application 123. The host application 123 transfers data to a kernel 125 on the HWA 120 via a driver 124 (see non-patent literature 3). In FIG. 16, reference numeral 126 denotes a memory; 127, a memory controller; 128, a PCI Express (PCIe) controller for connection between the CPU 121 and the HWA 120; and 129, an interconnect 129 that connects the memory controller 127 and the PCIe controller 128 to the kernel 125.

In the system as shown in FIG. 16, communication between the Network Interface Card (NIC) 122 and the host application 123 and communication between the host application 123 and the driver 124, which are originally unnecessary to access the HWA 120, occur. Also, low-speed software processing is performed in the host application 123 executed by the CPU 121. Hence, these delays increase a processing delay in the system.

In the cloud service using the SFC, SFs implemented in a plurality of server nodes are combined, and processing delays that occur in the server nodes are thus accumulated as a service delay. For this reason, a server node having the configuration shown in FIG. 16 is not suitable for a service that requests a low delay.

RELATED ART LITERATURE

Non-Patent Literature

Non-Patent Literature 1: RFC 7665-Service Function Chaining (SFC) Architecture, Internet Engineering Task Force (IETF), October 2015, <https://datatracker.ietf.org/doc/html/rfc7665>

Non-Patent Literature 2: Yuta UKON, Koji YAMAZAKI, Koyo NITTA, "Real-Time Image Processing Based on Service Function Chaining Using CPU-FPGA Architecture", IEICE Transactions on Communications, Vol. E103-B, No. 1, pp. 11-19, 2020, <https://search.ieice.org/bin/summary.php?id=e103-b_1_11>

Non-Patent Literature 3: "Intel FPGA SDK for OpenCL Pro Edition best Practices Guide", Intel Corporation, 2021, <https://www.intel.com/content/dam/www/programmable/us/en/pdfs/literature/hb/opencl-sdk/aocl-best-practices-guide.pdf>

SUMMARY

Problem to be Solved by the Invention

The present invention has been made to solve the above-described problem, and has as its object to provide a data transfer device, a data processing device, and a data processing method capable of implementing data transfer with a low delay in a data processing system that provides a service to a user by a service function chaining technique.

Means of Solution to the Problem

A data transfer device according to the present invention having, under control, a data processing device that performs processing of each service function constituting a service chain necessary for implementing a service requested by a user, the data transfer device comprises a plurality of packet reception units each configured to receive a packet from one of a user management apparatus and another data transfer device, which serves as a start point of the service chain; a packet analysis unit configured to acquire a tag from the packet received from one of the user management apparatus, the other data transfer device, and the data processing device under control; an input arbitration unit configured to selectively input a packet from one packet reception unit of the plurality of packet reception units to the packet analysis unit; a first transfer control unit configured to decide, based on route information of the service chain described in the tag, a transfer destination of the packet received from one of the user management apparatus, the other data transfer device, and the data processing device under control; a packet transmission unit configured to, if the transfer destination of the packet is the other data transfer device, transfer the packet to the data transfer device of the transfer destination; and an inter-device communication control unit configured to confirm a state of a shared bus if the transfer destination of the packet is the data processing device, and if the shared bus is usable, transfer the packet to the data processing device of the transfer destination via the shared bus and decide the transfer destination of the packet received from the data processing device under control based on the route information described in the tag, wherein if there exist a plurality of data processing devices under control, the inter-device communication control unit gives a use right of the shared bus to one of the data processing devices in response to communication requirements from the data processing devices, and performs arbitration between the data processing devices such that the packet is received, via the shared bus, from the data processing device given the use right.

A data processing device according to the present invention that performs processing of each service function constituting a service chain necessary for implementing a service requested by a user, the data transfer device comprises a plurality of service function units each configured to perform processing of a service function; a packet distribution unit configured to, upon receiving a packet from a data transfer device of a higher order connected by a shared bus, transfer the packet to a service function unit of a transfer destination among the plurality of service function units based on route information of the service chain described in a tag of the packet; and a communication requiring unit configured to, upon receiving the packet that has undergone data processing by the service function unit, require the data transfer device to use the shared bus, and if a use right of the shared bus is given, transfer the packet that has undergone the data processing to the data transfer device, wherein each service function unit comprises a packet order control unit configured to perform order control of arranging the packet received from the data transfer device in a correct order, a data acquisition unit configured to extract a payload from the packet output from the packet order control unit, a data construction unit configured to reconstruct original data before packetization from one or a plurality of payloads output from the data acquisition unit, a data processing unit configured to perform data processing of the service function for the data output from the data construction unit, and a packet creation unit configured to packetize the data that has undergone the data processing by the data processing unit and output the packet to the communication requiring unit.

Effect of the Invention

According to the present invention, since the data transfer device serves as a master and performs packet routing and arbitration between the data processing devices under control, communication of the same communication amount can be performed with any of the data processing devices under control. In the present invention, the data transfer device performs communication control at the network level, thereby transferring a packet to the data processing device with a low delay.

BRIEF DESCRIPTION OF THE DRAWINGS

FIG. 11 is a sequence chart for explaining an operation of the data processing system according to the embodiment of the present invention;

FIG. 12 is a sequence chart for explaining another operation of the data processing system according to the embodiment of the present invention;

DETAILED DESCRIPTION OF ILLUSTRATIVE EMBODIMENTS

Figure 1:
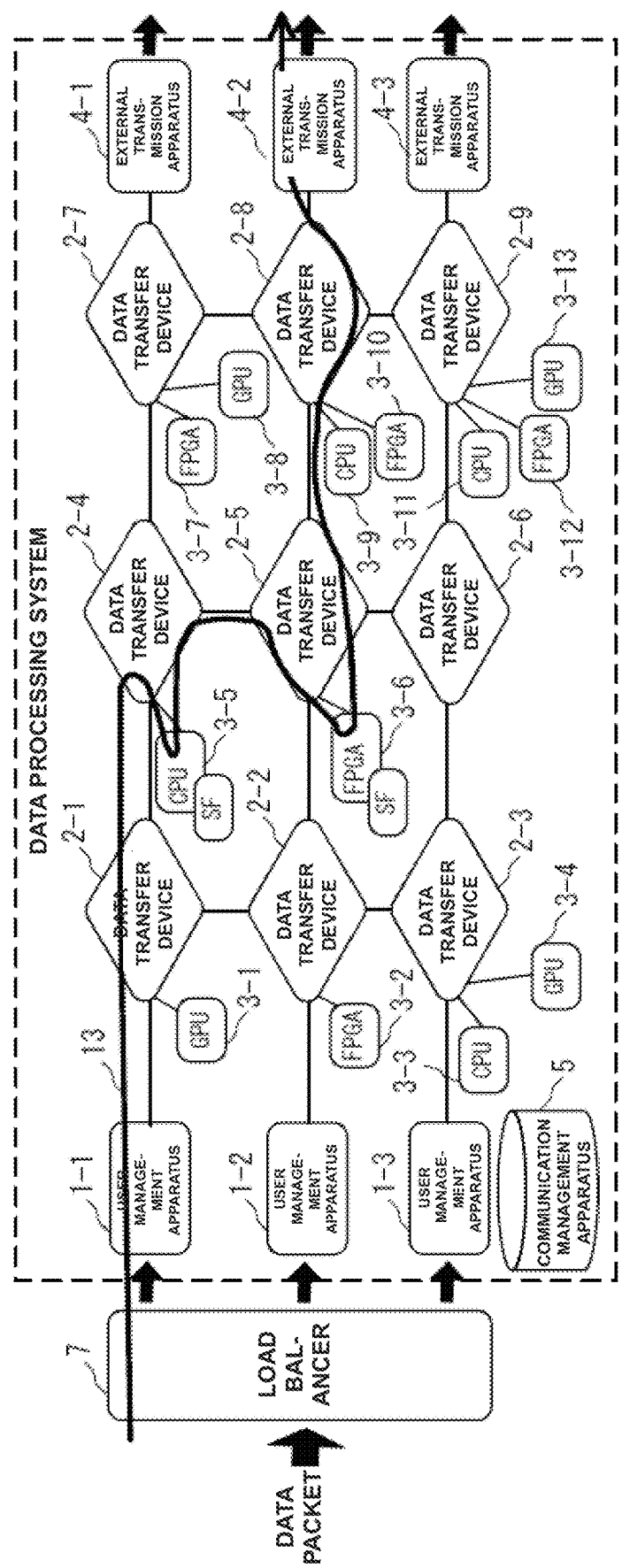
FIG. 1 is a block diagram showing the configuration of a data processing system according to the embodiment of the present invention.

An embodiment of the present invention will now be described with reference to the accompanying drawings. FIG. 1 is a block diagram showing the configuration of a data processing system according to the embodiment of the present invention. The data processing system includes user management apparatuses 1-1 to 1-3 each of which manages the information of a user who has applied use of a service and controls transfer of a packet received from the user, one or a plurality of data transfer devices 2-1 to 2-9 each of which transfers packets, data processing devices 3-1 to 3-13 each of which performs data processing in an SF for data included in a received packet, and external transmission apparatuses 4-1 to 4-3 each of which returns a packet that has undergone all data processes of a service chain to a user. The data processing system also includes a communication management apparatus 5 that calculates the route of a service chain necessary for implementing a service requested by each user, transmits route information to the user management apparatuses 1-1 to 1-3, and updates, based on the result of route calculation, routing tables registered in the data transfer devices 2-1 to 2-9 on the calculated route. As the data processing devices 3-1 to 3-13, a CPU, an FPGA, a GPU, an ASIC, and the like can be used.

In this embodiment, SFs implemented by the data processing devices 3-1 to 3-13 are combined, thereby providing a service customized for each user. More specifically, communication is performed between the data transfer devices 2-1 to 2-9, and a data packet sent from a user is transferred to an appropriate SF. If data processing in the SF is completed, the data packet is further transferred to another SF, and data processing is performed. Thus, in this embodiment, a service according to the purpose of a user is provided by changing the processing contents for each user.

Figure 15:
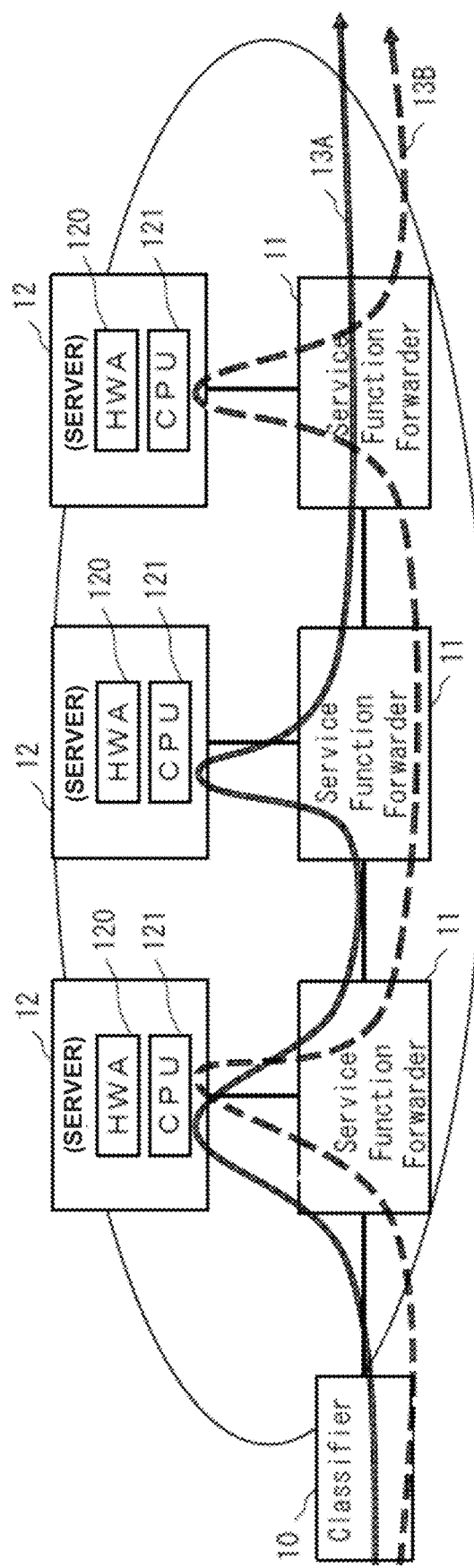
FIG. 15 is a view for explaining a conventional service function chaining technique.
Figure 16:
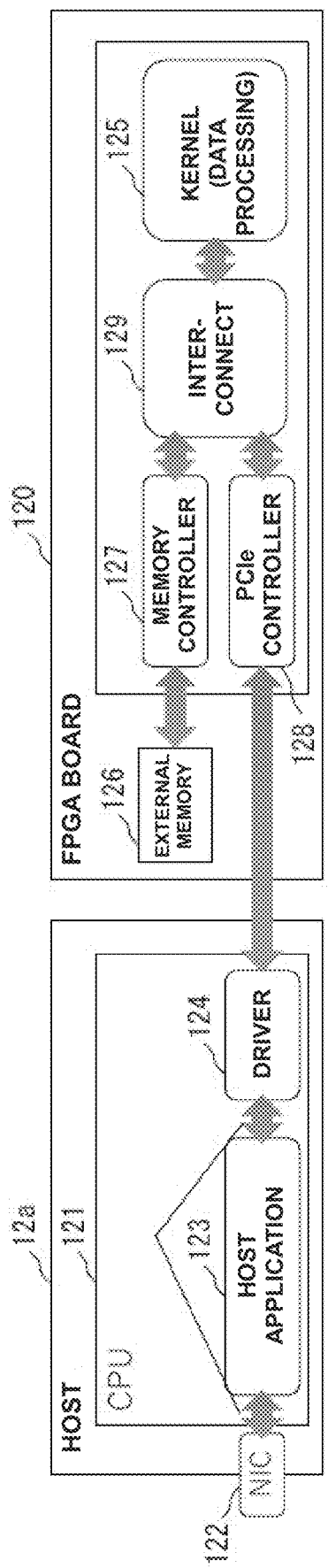
FIG. 16 is a view for explaining a problem of the conventional service function chaining technique.

A communication path through which a data packet passes is called a service chain. As in FIG. 15, reference numeral 13 in FIG. 1 denotes a service chain. If a plurality of users simultaneously use the service chain, data collide in the SFs, and an appropriate result cannot be guaranteed. Hence, in this embodiment, data packets are managed in the user management apparatuses 1-1 to 1-3 at the inlet of the data processing system, thereby controlling such that only one user can use the service chain.

Also, the user management apparatuses 1-1 to 1-3 each add a tag to each data packet. In the tag, the route information of the service chain is described. The data transfer devices 2-1 to 2-9 perform routing of a data packet based on the tag. Detailed examples of the tag are a Network Service Header (NSH), a Multi-Protocol Label Switching (MPLS) header, and a Segment Routing over IPv6 (SRv6). A unique header may be defined.

In routing using a Media Access Control (MAC) address or an Internet Protocol (IP) address, a large routing table needs to be provided in each of the data transfer devices 2-1 to 2-9. On the other hand, in routing using a tag, as in this embodiment, the scale of the routing table is made small by causing a data packet to include route information, thereby decreasing the calculation resource or memory resource necessary for routing.

The external transmission apparatuses 4-1 to 4-3 each add destination information to the data packet that has undergone all data processes, and return it to the user. The reason why the external transmission apparatuses 4-1 to 4-3 are necessary is that protocols used in and outside the data processing system are different. As communication outside the data processing system, TCP/IP is used as the world standard. On the other hand, in the data processing system, packet communication using a tag is performed due to the above-described reason. Hence, to absorb the difference of the protocols in and outside the data processing system, the external transmission apparatuses 4-1 to 4-3 are used.

Figure 2:
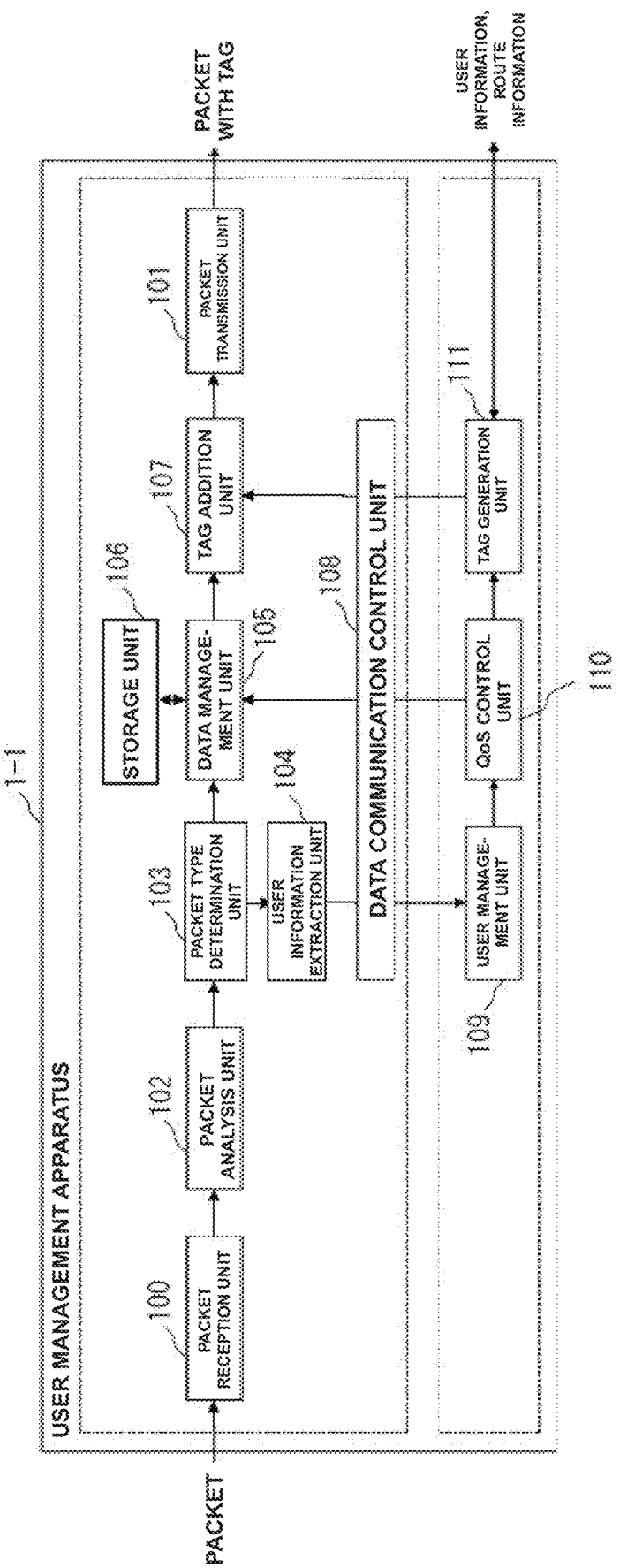
FIG. 2 is a block diagram showing the configuration of a user management apparatus according to the embodiment of the present invention.

FIG. 2 is a block diagram showing the configuration of the user management apparatus 1-1. The user management apparatus 1-1 includes a packet reception unit 100, a packet transmission unit 101, a packet analysis unit 102 that analyzes a received packet, a packet type determination unit 103 that determines the type of the received packet, a user information extraction unit 104 that extracts user information from the packet, a data management unit 105 that transfers the packet received from the user to a tag addition unit 107 at a timing according to a priority, a storage unit 106 configured to temporarily store the packet received from the user, the tag addition unit 107 that adds a tag to the packet received from the user, a data communication control unit 108, a user management unit 109 that manages the information of a user who has applied use of a service, issues a user ID, and notifies the user of the issued user ID, a Quality of Service (QOS) control unit 110 that decides the priority of transfer of a packet for each user based on the information of the user managed by the user management unit 109, and a tag generation unit 111 that generates a tag that describes route information received from the communication management apparatus 5.

Figure 3:
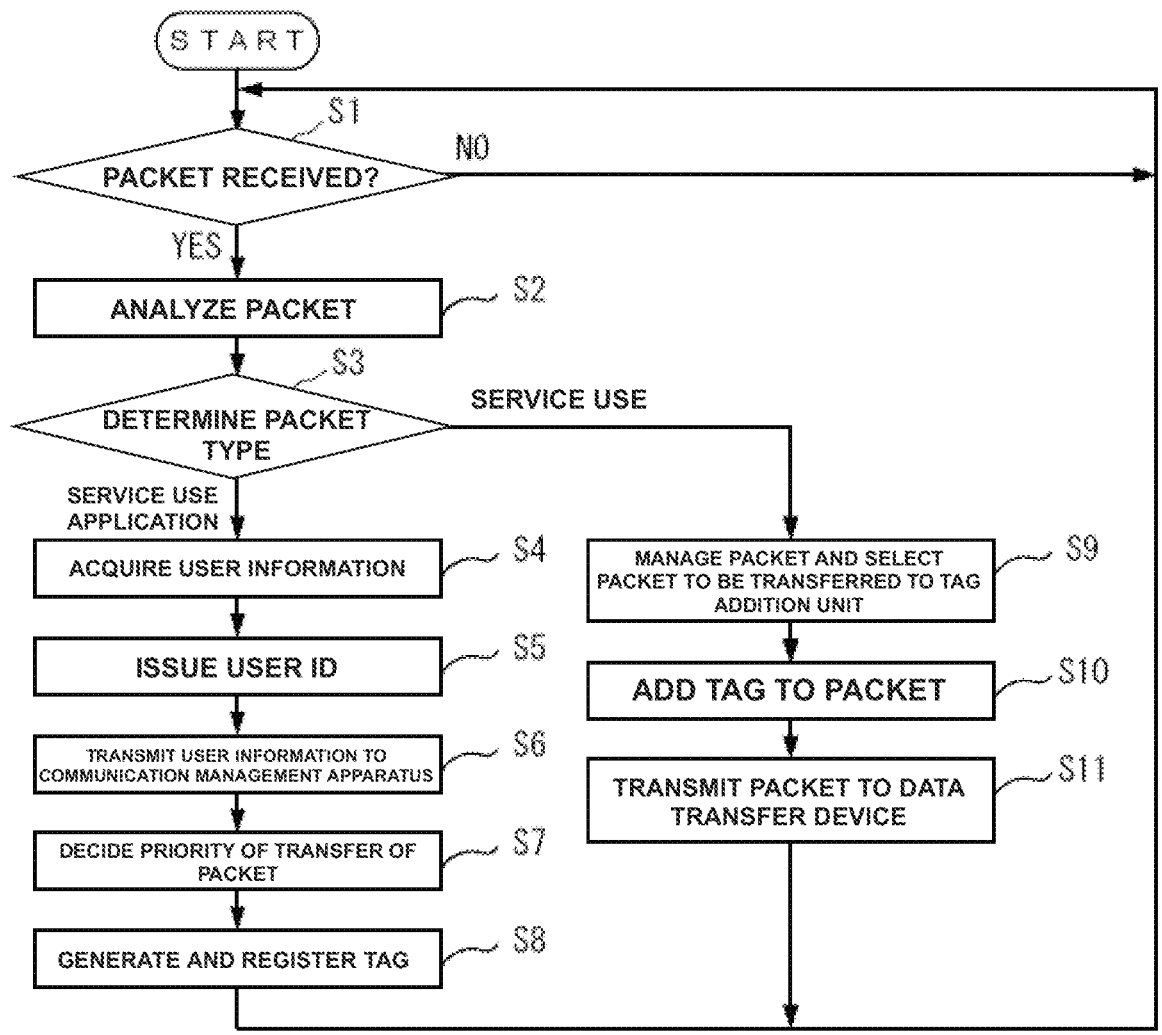
FIG. 3 is a flowchart for explaining the operation of the user management apparatus according to the embodiment of the present invention.

FIG. 3 is a flowchart for explaining the operation of the user management apparatus 1-1. If the packet reception unit 100 of the user management apparatus 1-1 receives a packet (step S1 in FIG. 3), first, the packet analysis unit 102 analyzes the packet (step S2 in FIG. 3).

The packet type determination unit 103 determines the packet type based on the analysis result by the packet analysis unit 102 (step S3 in FIG. 3). Packet types are "service use application" and "service use".

The packet type determination unit 103 sends a packet whose packet type is "service use application" to the user information extraction unit 104, and sends a packet whose packet type is "service use" to the data management unit 105.

The user information extraction unit 104 acquires user information (an ID address, a port number, a contract number, service information, a priority, and the like) described in the packet received from the packet type determination unit 103 (step S4 in FIG. 3). The user information extraction unit 104 sends the acquired user information to the user management unit 109.

The user management unit 109 manages the user information received from the user information extraction unit 104. The user management unit 109 issues, to the user, a user ID needed to use the service (step S5 in FIG. 3), and transfers the user information to the communication management apparatus 5 together with the user ID (step S6 in FIG. 3).

The QoS control unit 110 decides the priority of packet transfer for each user based the priority or the information of the service requested by the user, and registers the priority information (QOS information) in the data management unit 105 (step S7 in FIG. 3).

The tag generation unit 111 receives the route information from the communication management apparatus 5, and generates a tag in which the route information is described.

Then, the tag generation unit 111 associates the generated tag with the user ID issued by the user management unit 109 and registers these in the tag addition unit 107 (step S8 in FIG. 3).

The data management unit 105 receives the packet determined as "service use" by the packet type determination unit 103, distributes the received packet on a user basis, and temporarily stores it in the storage unit 106. The data management unit 105 then extracts the packet of a specific user for each service chain from the storage unit 106 based on the information of the priority registered by the QoS control unit 110 and transfers it to the tag addition unit 107 (step S9 in FIG. 3).

If a user ID is issued to a user, the user ID is added by the user to a packet whose packet type is "service use", as will be described later.

The tag addition unit 107 adds, to the received packet, a tag corresponding to the user ID added to the packet received from the data management unit 105 among the tags registered by the tag generation unit 111, and outputs the packet with the tag to the packet transmission unit 101 (step S10 in FIG. 3).

The packet transmission unit 101 transmits the packet output from the tag addition unit 107 to the closest one of the data transfer devices 2-1 to 2-9 (step S11 in FIG. 3).

As described above, detailed examples of the tag are an NSH and an MPLS header. Also, a unique header may be defined. In place of the tag, a MAC address or an IP address can also be used. However, in a method using a MAC address or an IP address, the data transfer devices 2-1 to 2-9 need to have a large-scale routing table, and more calculation resources and memory resources are consumed as compared to a method using a tag.

Note that in the example shown in FIGS. 2 and 3, a description has been made using the user management apparatus 1-1 as an example, and the configuration and operation of the user management apparatuses 1-2 and 1-3 are the same as the user management apparatus 1-1.

Figure 4:
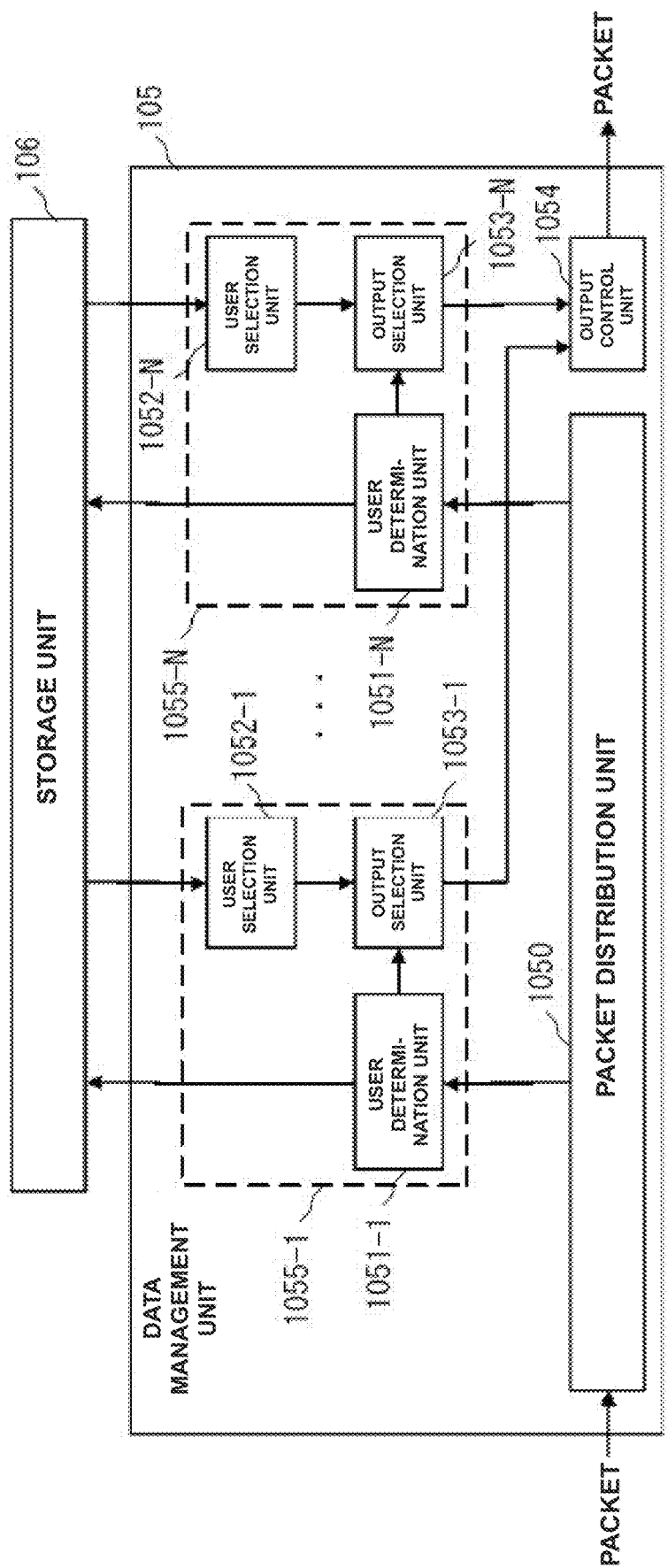
FIG. 4 is a block diagram showing the configuration of the data management unit of the user management apparatus according to the embodiment of the present invention.

FIG. 4 is a block diagram showing the configuration of the data management unit 105 of each of the user management apparatuses 1-1 to 1-3. The data management unit 105 is formed by a packet distribution unit 1050, one or a plurality of user determination units 1051-1 to 1051-N (N is an integer of 1 or more), one or a plurality of user selection units 1052-1 to 1052-N, one or a plurality of output selection units 1053-1 to 1053-N, and an output control unit 1054.

The user determination unit 1051-1, the user selection unit 1052-1, and the output selection unit 1053-1 form a memory controller 1055-1. Similarly, the user determination unit 1051-N, the user selection unit 1052-N, and the output selection unit 1053-N form a memory controller 1055-N. Each of the memory controllers 1055-1 to 1055-N performs storage and extraction of data packets in and from the storage unit 106. Although one memory controller may suffice, if a plurality of memory controllers are provided, access to the storage unit 106 can be parallelized, and processing performance can be improved.

The data management unit 105 manages a data packet received from the packet type determination unit 103 for each user, and outputs it to the tag addition unit 107 at the subsequent stage at an appropriate timing.

The packet distribution unit 1050 decides a memory controller that controls storage of the data packet received from the packet type determination unit 103 and outputs the data packet to the user determination unit 1051 (1051-1 to 1051-N) of the decided memory controller. Note that if a part of the user ID is the number of a memory controller, the packet distribution unit 1050 can perform distribution at a high speed. In deciding the memory controller to distribute the packet, it is appropriately decided in accordance with, for example, the free state of the memory controller for processing.

The user determination units 1051-1 to 1051-N each refer to the user ID of the packet received from the packet distribution unit 1050, and decide to which of the storage unit 106 and the output selection units 1053-1 to 1053-N the packet should be transferred.

More specifically, upon receiving a packet having the same user ID as the user ID of the packet that is currently being output from a corresponding one of the output selection units 1053-1 to 1053-N belonging to the same memory controller as the user determination unit itself, each of the user determination units 1051-1 to 1051-N transfers the received packet to the corresponding one of the output selection units 1053-1 to 1053-N belonging to the same memory controller as the user determination unit itself. Also, upon receiving a packet having a user ID that is different from the user ID of the packet that is currently being output from a corresponding one of the output selection units 1053-1 to 1053-N belonging to the same memory controller as the user determination unit itself, each of the user determination units 1051-1 to 1051-N temporarily stores the received packet in the storage unit 106.

Each of the user selection units 1052-1 to 1052-N selectively extracts the data packet from the storage unit 106 based on the QoS information (information of priority) registered by the QoS control unit 110. When not performing QoS control, the user selection units 1052-1 to 1052-N each extract the data packet stored first among the data packets stored in the storage unit 106.

Each of the output selection units 1053-1 to 1053-N selects which data packet received from which one of the user determination units 1051-1 and the user selection units 1052-1 to 1052-N belonging to the same memory controller as the output selection unit itself should be output. Since a back pressure can be applied to the user selection units 1052-1 to 1052-N, data packets received from the user determination units 1051-1 to 1051-N are preferentially output. The packet order may be changed by the selection. For this reason, the data processing devices 3-1 to 3-13 need to have a packet order control function.

The output control unit 1054 outputs the packets output from the output selection units 1053-1 to 1053-N to the tag addition unit 107. If there exist a plurality of memory controllers (output selection units 1053-1 to 1053-N), the output control unit 1054 controls which packet from which memory controller should be output to the tag addition unit 107. As the control method, a round robin method, a best effort method, a DiffServ method (QoS), or the like can be used.

Upon receiving a packet having a user ID that is different from the user ID of the packet that is currently being output from a corresponding one of the output selection units 1053-1 to 1053-N belonging to the same memory controller as the user determination unit itself, each of the user determination units 1051-1 to 1051-N may directly store the received packet in the storage unit 106. At this time, if a packet having the same user ID as the received packet is already stored in the storage unit 106, the user determination units 1051-1 to 1051-N may store the stored packet and the received packet in the storage unit 106 such that these are connected, thereby causing the storage unit 106 to hold larger data.

Figure 5:
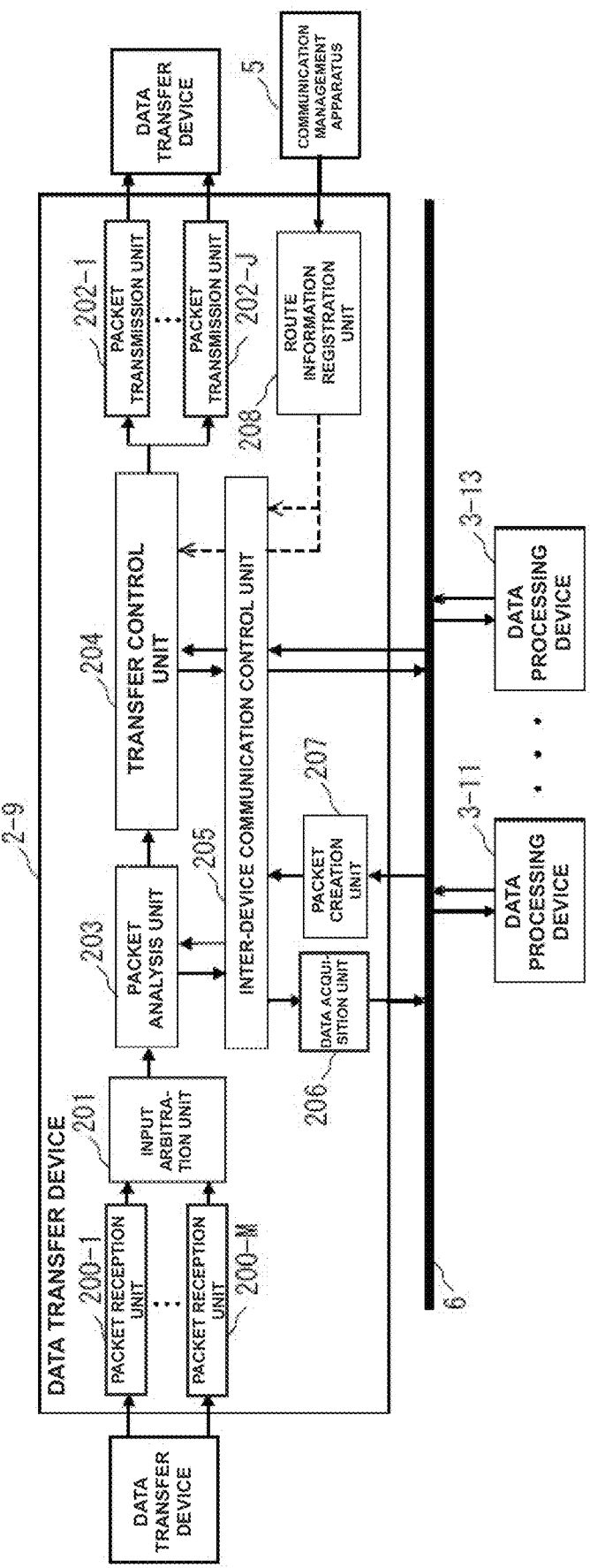
FIG. 5 is a block diagram showing the configuration of a data transfer device according to the embodiment of the present invention.

FIG. 5 is a block diagram showing the configuration of the data transfer device 2-9. The data transfer device 2-9 includes one or a plurality of packet reception units 200-1 to 200-M (M is an integer of 1 or more) each of which receives a packet from one of the user management apparatuses 1-1 to 1-3 and other data transfer devices, an input arbitration unit 201 that performs arbitration between the packet reception units such that a packet from one of the packet reception units 200-1 to 200-M is selected, one or a plurality of packet transmission units 202-1 to 202-J (J is an integer of 1 or more) each of which transfers a packet to one of the other data transfer devices and external transmission apparatuses 4-1 to 4-3, a packet analysis unit 203 that acquires a tag from a received packet, a transfer control unit 204 that decides, based on route information described in the tag, the transfer destination of the packet received from one of the user management apparatuses 1-1 to 1-3, other data transfer devices, and the data processing devices 3-11 to 3-13 under control, and an inter-device communication control unit 205 that transfers the packet to the data processing device of the transfer destination if the transfer destination of the packet is one of the data processing devices 3-11 to 3-13 under control.

Also, the data transfer device 2-9 includes a data acquisition unit 206 that, if the transfer destination of the packet is one of the data processing devices 3-11 to 3-13 under control, reconstructs original data from the payload of the packet, and transfers the reconstructed data to the data processing device of the transfer destination, a packet creation unit 207 that packetizes data received from one of the data processing devices 3-11 to 3-13 under control, which has undergone the data processing in the SF, and transmits the generated packet to the inter-device communication control unit 205, and a route information registration unit 208 that updates a routing table registered in each of the transfer control unit 204 and the inter-device communication control unit 205 based on information from the communication management apparatus 5.

If one of the packet reception units 200-1 to 200-M of the data transfer device 2-9 receives a data packet from the user management apparatus at the preceding state or another data transfer device, the packet analysis unit 203 analyzes the data packet, acquires a tag added to the data packet, and outputs the received data packet to the transfer control unit 204.

Based on the route information described in the tag acquired by the packet analysis unit 203 and the routing table registered in itself, the transfer control unit 204 transfers the data packet output from the packet analysis unit 203 to one of the data processing devices 3-11 to 3-13 under control via the inter-device communication control unit 205, or transfers the data packet output from the packet analysis unit 203 to an adjacent data transfer device via one of the packet transmission units 202-1 to 202-J.

In this embodiment, the data transfer device 2-9 includes the plurality of packet reception units 200-1 to 200-M, thereby forming a two- or three-dimensional network. In this configuration, the packet reception units 200-1 to 200-M sometimes receive packets simultaneously.

For this reason, the input arbitration unit 201 performs arbitration between the packet reception units 200-1 to 200-M to selectively input, to the packet analysis unit 203, a packet from one packet reception unit among the packets received by the plurality of packet reception units 200-1 to 200-M and make other packet reception units stand by. As for the selection method, basically, a packet that has arrived first is sent to the packet analysis unit 203. If the packet reception units 200-1 to 200-M happen to simultaneously receive packets, the input arbitration unit 201 may sequentially select a packet reception unit in the ascending order of preset numbers of the packet reception units 200-1 to 200-M or may select a packet reception unit in accordance with preset priorities of the packet reception units 200-1 to 200-M.

The inter-device communication control unit 205 transfers the packet sent from the transfer control unit 204 to the data processing devices 3-11 to 3-13 under control via a shared bus 6.

If the data processing devices 3-11 to 3-13 under control are data processing devices that are not good at packet processing, like a GPU, the data acquisition unit 206 may perform packet processing to reconstruct original data (data stored in the payload of the packet) and then transfer the data.

More specifically, the data acquisition unit 206 extracts the payload from the packet sent from the transfer control unit 204 and combines payloads acquired from one or a plurality of data packets with the same user ID, thereby reconstructing original data. Since the order of the packets that have arrived may have been changed, the data acquisition unit 206 performs packet order control and arranges the data extracted from the plurality of packets in a correct order. The order control is performed based on sequence numbers added to the packets.

Also, when reconstructing original data by the data acquisition unit 206 and sending it, a packet header extracted from the data packet needs to be saved in the packet creation unit 207. The packet creation unit 207 saves the packet header received from the data acquisition unit 206 in association with the user ID.

The inter-device communication control unit 205 also performs communication control between the data processing devices 3-11 to 3-13 under control. Hence, the transfer control unit 204 can focus on communication between the self-device and the user management apparatuses 1-1 to 1-3, other data transfer devices, or the external transmission apparatuses 4-1 to 4-3, and expand the communication band.

If the data processing devices 3-11 to 3-13 under control are data processing devices that are not good at packet processing, like a GPU, the packet creation unit 207 may receive data from the data processing devices 3-11 to 3-13 under control via the shared bus 6 and packetize the data.

More specifically, the packet creation unit 207 packetizes data received from the data processing devices 3-11 to 3-13, and transmits the generated packet to the inter-device communication control unit 205. At this time, the packet creation unit 207 packetizes the received data in combination with, among packet headers received from the data acquisition unit 206 and saved, a packet header corresponding to a user ID added to the data received from the data processing devices 3-11 to 3-13. The packet header includes a tag in which route information corresponding to the SF that has performed data processing is deleted.

In this embodiment, the data acquisition unit 206 and the packet creation unit 207 perform packet processing in place of the data processing devices, thereby reducing the processing delays of the data processing devices 3-11 to 3-13 that are not good at packet processing.

The route information registration unit 208 updates the routing table of the transfer control unit 204 and the routing table of the inter-device communication control unit 205 in accordance with information sent from the communication management apparatus 5. Since only information necessary for routing of the self-device is sent from the communication management apparatus 5, the routing tables can be formed by a relatively small number of memory resources.

As the data transfer device 2-9, for example, a CPU or a GPU may be used, and processing of the data transfer device 2-9 may be executed by software. Alternatively, as the data transfer device 2-9, for example, an FPGA may be used, and processing of the data transfer device 2-9 may be executed by hardware. However, to implement a high-speed network, hardware is preferably used because hardware has high packet processing performance in general.

With the above-described configuration, the data transfer device 2-9 can transfer a data packet to any of the data processing devices 3-11 to 3-13 under control at the shortest.

Figure 6:
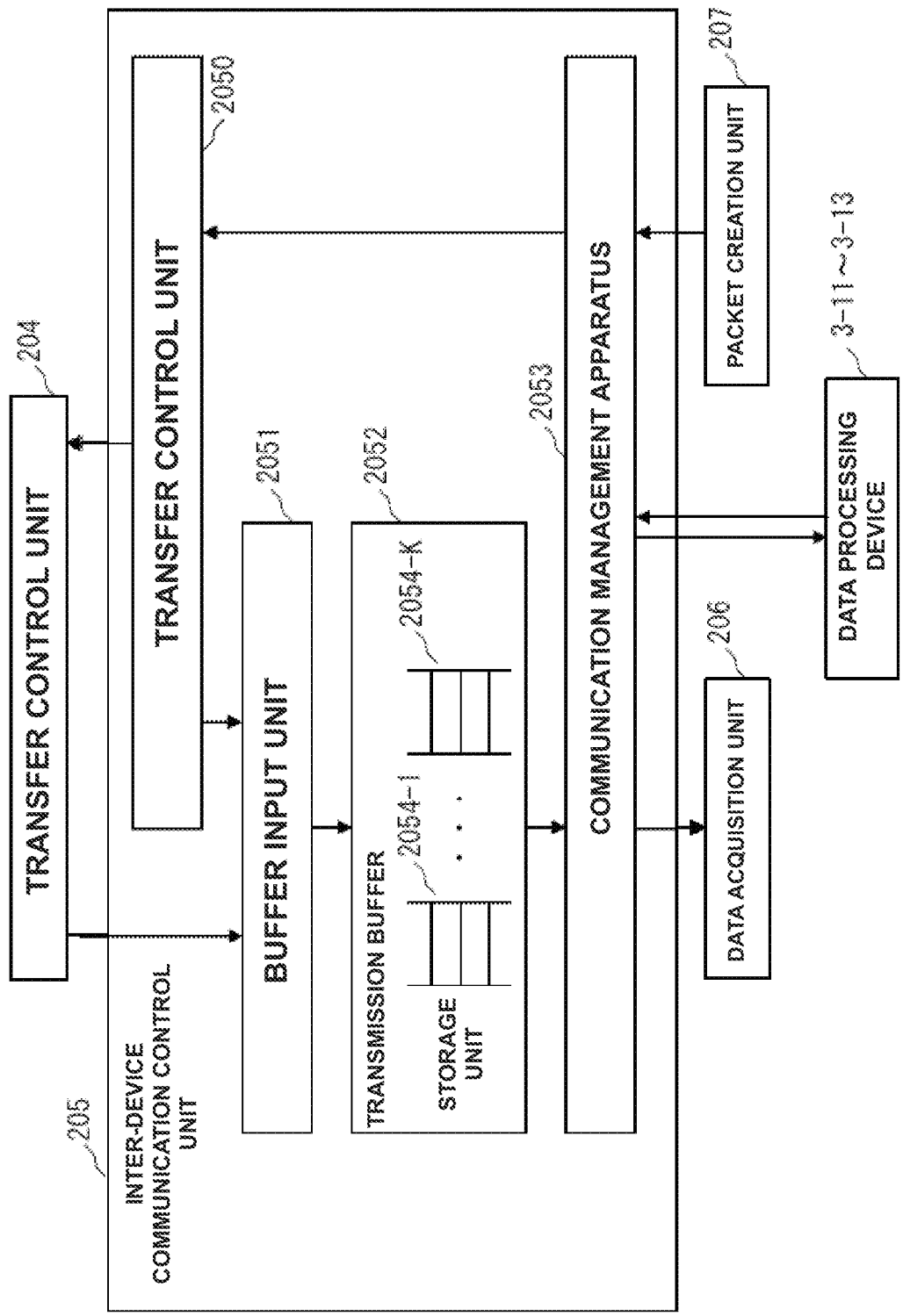
FIG. 6 is a block diagram showing the configuration of the inter-device communication control unit of the data transfer device according to the embodiment of the present invention.

FIG. 6 is a block diagram showing the configuration of the inter-device communication control unit 205 of the data transfer device 2-9. The inter-device communication control unit 205 is formed by a transfer control unit 2050 that decides the transfer destination of the packet based on route information described in the tag in a case where the transfer destination of the packet received from one of the data processing devices 3-11 to 3-13 under control is another data processing device under control, a buffer input unit 2051 that stores the packet in one of storage units (FIFO buffers) 2054-1 to 2054-K (K is an integer of 1 or more) of a transmission buffer 2052 corresponding to the data processing device of the transfer destination in a case where the transfer destination of the packet is one of the data processing devices 3-11 to 3-13 under control, the transmission buffer 2052 including the storage units 2054-1 to 2054-K assigned to the data processing devices under control, respectively, and a communication management unit 2053 that transfers the packets stored in the transmission buffer 2052 to the data processing devices 3-11 to 3-13 of the transfer destinations and receive packets from the data processing devices 3-11 to 3-13.

The inter-device communication control unit 205 transfers the packet sent from the transfer control unit 204 to the data processing devices 3-11 to 3-13 under control via the transmission buffer 2052 based on the route information described in the tag acquired by the packet analysis unit 203 and the routing table registered in itself.

Also, the packet analysis unit 203 of the data transfer device 2-9 analyzes the packet that the inter-device communication control unit 205 receives from one of the data processing devices 3-11 to 3-13 under control and acquires a tag added to the packet. Based on route information described in the tag acquired by the packet analysis unit 203 and the routing table registered in itself, the inter-device communication control unit 205 examines the transfer destination of the packet sent from the data processing devices 3-11 to 3-13 and transfers the packet to the data processing devices 3-11 to 3-13 or the transfer control unit 204.

The shared bus 6 cannot perform a plurality of communications at once. For this reason, the data packet transferred to the data processing devices 3-11 to 3-13 is temporarily stored from the transfer control unit 204 or the transfer control unit 2050 in the transmission buffer 2052 via the buffer input unit 2051.

The transmission buffer 2052 is formed by one or the plurality of storage units (FIFO buffers) 2054-1 to 2054-K. One data processing device of the data processing devices 3-11 to 3-13 and one storage unit of the storage units 2054-1 to 2054-K are associated in a one-to-one correspondence. The buffer input unit 2051 stores a data packet in one of the storage units 2054-1 to 2054-K corresponding to the data processing device of the transfer destination. However, the association between the data processing devices and the storage units is not permanent. The association can flexibly be changed along with addition/deletion of the data processing devices 3-11 to 3-13.

The communication management unit 2053 extracts a data packet from one of the storage units 2054-1 to 2054-K when the shared bus 6 is free, and transfers the data packet to one of the data processing devices 3-11 to 3-13 of the transfer destination corresponding to the storage unit of the extraction source.

Also, upon receiving a request to use the shared bus 6 from one of the data processing devices 3-11 to 3-13 under control, the communication management unit 2053 gives the use right of the shared bus 6 to one of the data processing devices and receives a data packet from the data processing device via the shared bus 6, and simultaneously, performs arbitration between the data processing devices 3-11 to 3-13 to cause other data processing devices that have issued the use request of the shared bus 6 to wait. The use right acquisition can be performed in order of arrival. Alternatively, in accordance with the use right acquisition frequency, the use right may be given to one of the data processing devices 3-11 to 3-13 or the storage units 2054-1 to 2054-K, which issues the request later. Alternatively, priority orders may be set in advance for the data processing devices 3-11 to 3-13 or the storage units 2054-1 to 2054-K, and the use right giving destination may be obtained in consideration of the priority order. Furthermore, a priority may be given to a packet, or the priority order may temporarily be changed in accordance with an instruction from the outside.

As described above, the packet analysis unit 203 of the data transfer device 2-9 analyzes the packet that the inter-device communication control unit 205 receives from one of the data processing devices 3-11 to 3-13 under control and acquires the tag added to the packet.

Based on the route information described in the tag acquired by the packet analysis unit 203 and the routing table registered in itself, the transfer control unit 2050 of the inter-device communication control unit 205 examines the transfer destination of the packet sent from the data processing devices 3-11 to 3-13 and transfers the packet to the buffer input unit 2051 or the transfer control unit 204. The packet transferred to the buffer input unit 2051 is transferred to the data processing devices 3-11 to 3-13 under control by the above-described operation.

The transfer control unit 204 decides the transfer destination of a packet received from one of the user management apparatuses 1-1 to 1-3 or another data transfer device or the transfer destination if one of packets received from the data processing devices 3-11 to 3-13 under control is to be transferred to another data transfer device or one of the external transmission apparatuses 4-1 to 4-3. On the other hand, the transfer control unit 2050 decides the transfer destination of a packet based on route information described in the tag only when the transfer destination of a packet received from one data processing device under control is another data processing device under control. Hence, since the transfer control unit 2050 holds only route information between the data processing devices 3-11 to 3-13 under control, the table scale is small, and high-speed routing can be performed.

With the above-described configuration, it is possible to access all the data processing devices 3-11 to 3-13 with the same delay via the inter-device communication control unit 205 and perform communication between the data processing devices 3-11 to 3-13 without interposing the transfer control unit 204. Also, in this embodiment, since the data processing devices 3-11 to 3-13 are independent of the data transfer device 2-9, a new data processing device can be added or deleted without impeding communication between the data transfer device 2-9 and the user management apparatuses 1-1 to 1-3, other data transfer devices 2-1 to 2-8, or the external transmission apparatuses 4-1 to 4-3.

Note that in the example shown in FIGS. 5 and 6, a description has been made using the data transfer device 2-9 and the data processing devices 3-11 to 3-13 as an example. The configuration and operation of the data transfer devices 2-1 to 2-8 are the same as the data transfer device 2-9, and the operation of the data processing devices 3-1 to 3-10 is the same as the data processing devices 3-11 to 3-13.

Figure 7:
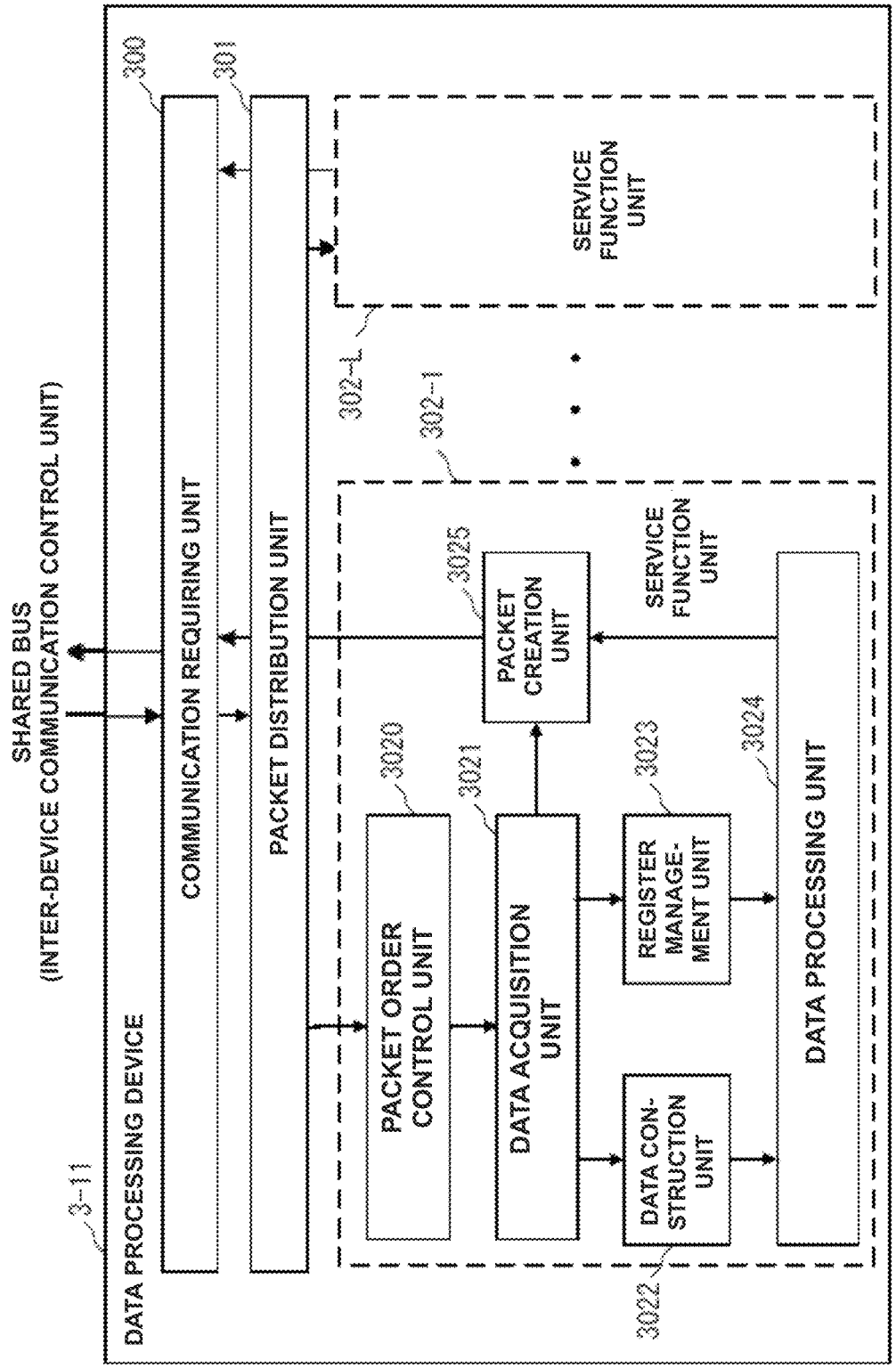
FIG. 7 is a block diagram showing the configuration of a data processing device according to the embodiment of the present invention.

FIG. 7 is a block diagram showing the configuration of the data processing device 3-11. The data processing device 3-11 is formed by a communication requiring unit 300 that requires the data transfer device 2-9 to use the shared bus 6 upon receiving a packet that has undergone data processing by one of service function units (to be referred to as SF units hereinafter) 302-1 to 302-L (L is an integer of 1 or more) for performing processing in SFs, and if the right to use the shared bus 6 is given, transfers the packet to the data transfer device 2-9, a packet distribution unit 301 that, upon receiving the packet from the data transfer device 2-9, transfers the packet to the SF unit of the transfer destination among the SF units 302-1 to 302-L based on the route information described in the tag of the packet, and the SF units 302-1 to 302-L.

Each of the SF units 302-1 to 302-L is formed by a packet order control unit 3020, a data acquisition unit 3021, a data construction unit 3022, a register management unit 3023, a data processing unit 3024, and a packet creation unit 3025.

Upon receiving a data packet from the data transfer device 2-9 via the shared bus 6, the data processing device 3-11 distributes the data packet to one of the SF units 302-1 to 302-L. The data processing device 3-11 includes the packet distribution unit 301 not to cause the inter-device communication control unit 205 of the data transfer device 2-9 of the higher order to excessively have the transmission buffer 2052 and to efficiently use the shared bus 6 on a data processing device basis.

Before data processing, each of the SF units 302-1 to 302-L reconstructs data while changing the order of data packets. Order control is performed because the order of the packets may have been changed in the external network or the user management apparatuses 1-1 to 1-3. More specifically, the packet order control unit 3020 of each of the SF units 302-1 to 302-L arranges, in a correct order, a plurality of data packets that are sent from the data transfer device 2-9 and have the same user ID. The order control is performed based on sequence numbers added to the packets.

The data acquisition unit 3021 of each of the SF units 302-1 to 302-L extracts a payload from each of the data packets arranged in the correct order by the packet order control unit 3020. Also, the data acquisition unit 3021 refers to route information described in a tag included in the packet header of each data packet and updates the route information described in the tag to exclude the SF unit itself (one of the SF units 302-1 to 302-L) from the route of the service chain. Then, to reuse the packet header after tag updating later, the data acquisition unit 3021 transfers the packet header to the packet creation unit 3025. By the tag updating, the SF units 302-1 to 302-L that have completed the processing are never selected as the transfer destination again.

The data construction unit 3022 of each of the SF units 302-1 to 302-L combines the payloads acquired by the data acquisition unit 3021 from the plurality of data packets, thereby reconstructing original data.

The data processing unit 3024 of each of the SF units 302-1 to 302-L executes predetermined processing for the data received from the data construction unit 3022, and transmits the data after the processing to the packet creation unit 3025. Examples of data processing are machine learning and image processing. Also, the data processing unit 3024 may be caused to function as a shared memory.

In this way, each of the SF units 302-1 to 302-L executes processing of the SF.

The packet creation unit 3025 of each of the SF units 302-1 to 302-L packetizes the data received from the data processing unit 3024 by combining it with the packet header received from the data acquisition unit 3021, and transmits the data to the communication requiring unit 300. At this time, if the data received from the data processing unit 3024 needs to be divided, the packet creation unit 3025 packetizes each of the divided data by combining it with the packet header received from the data acquisition unit 3021.

Upon receiving the data packet from the packet creation unit 3025, the communication requiring unit 300 of the data processing device 3-11 requests the data transfer device 2-9 of the higher order to use the shared bus 6, and after the use right of the shared bus 6 is given by the data transfer device 2-9, transmits the data packet to the data transfer device 2-9. Note that the communication requiring unit 300 receives a data packet from the packet creation unit 3025 of each of the SF units 302-1 to 302-L until the use right of the shared bus 6 is given, and transmits the data packets at once when the use right of the shared bus 6 is given, thereby raising the efficiency of communication.

The register management unit 3023 performs parameter registration and parameter acquisition for the data processing unit 3024. More specifically, the register management unit 3023 acquires a user-specific parameter necessary for processing of the SF from each of the user management apparatuses 1-1 to 1-3, as will be described later, and registers the acquired parameter in the data processing unit 3024. The parameter registration is performed for each user (each user ID).

Also, upon receiving a recovery request packet from the user management apparatuses 1-1 to 1-3, the register management unit 3023 deletes a parameter corresponding to a user ID included in the recovery request packet from the data processing unit 3024. The packet creation unit 3025 packetizes the parameter registered in the data processing unit 3024, and returns it to the user management apparatuses 1-1 to 1-3 of the request source. Thus, the parameter is managed in association with the user ID in the user management apparatuses 1-1 to 1-3. By such a parameter registration and recovery function, the parameter can be changed for each user, and data processing can be performed using a parameter suitable for the user.

Note that in the example shown in FIG. 7, a description has been made using the data processing device 3-11 as an example. The configuration and operation of the data processing devices 3-1 to 3-10, 3-12, and 3-13 are the same as the data processing device 3-11.

Figure 8:
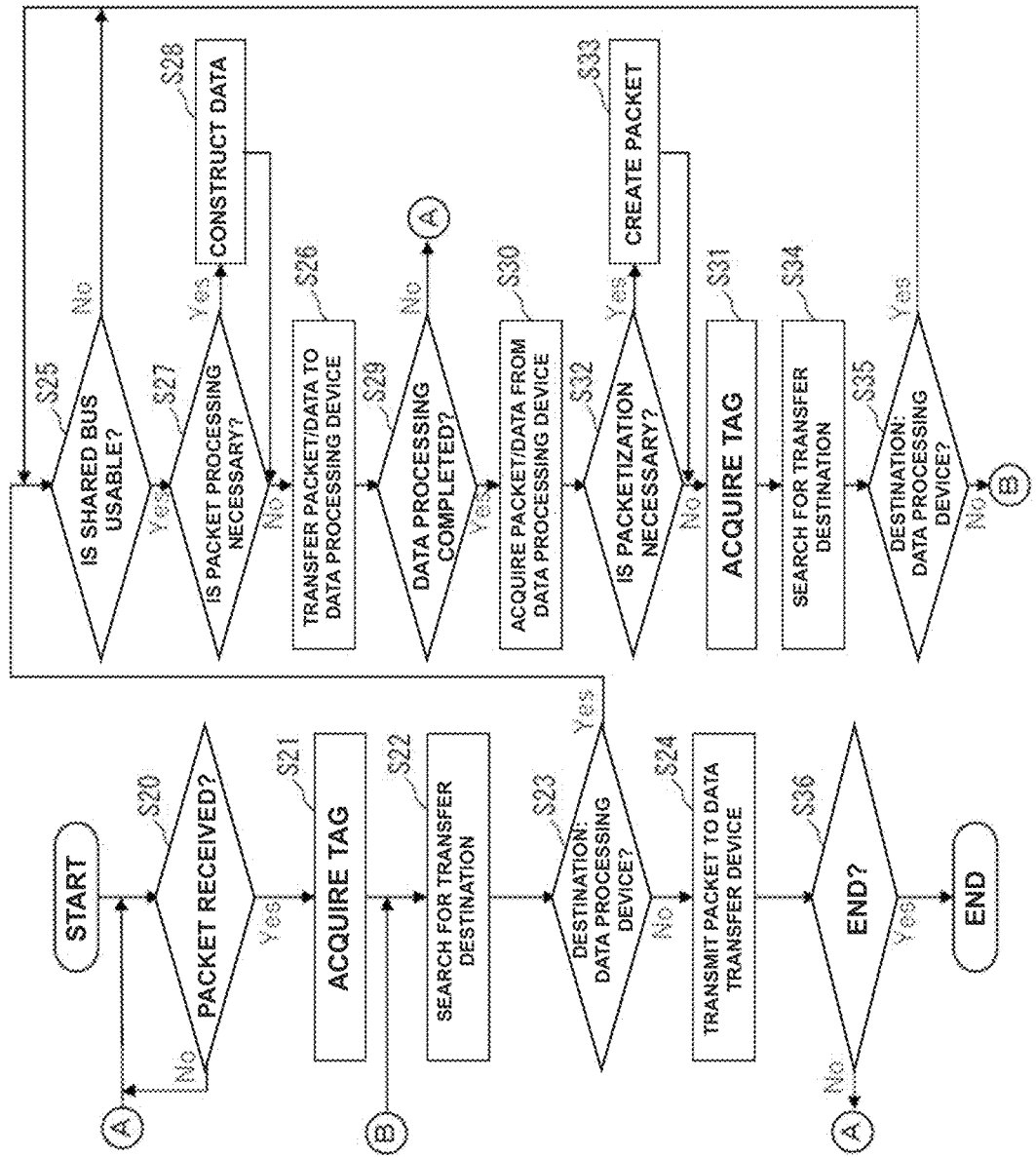
FIG. 8 is a flowchart for explaining the operation of the data transfer device according to the embodiment of the present invention.

FIG. 8 is a flowchart for explaining the operation of the data transfer device 2-9. If one of the packet reception units 200-1 to 200-M of the data transfer device 2-9 receives a data packet from the user management apparatus or another data transfer device at the preceding stage (YES in step S20 in FIG. 8), the packet analysis unit 203 analyzes the data packet, acquires a tag added to the data packet, and outputs the received data packet to the transfer control unit 204 (step S21 in FIG. 8).

The transfer control unit 204 searches the routing table registered in the self-device using route information described in the tag acquired by the packet analysis unit 203 as a search key, and decides the transfer destination of the data packet output from the packet analysis unit 203 (step S22 in FIG. 8).

If the transfer destination is an adjacent data transfer device or an adjacent external transmission apparatus (NO in step S23 in FIG. 8), the transfer control unit 204 transfers the data packet from an appropriate one of the packet transmission units 202-1 to 202-J to the transfer destination (step S24 in FIG. 8). Here, the appropriate one of the packet transmission units 202-1 to 202-J means an output destination (the packet transmission units 202-1 to 202-J) obtained by the routing result in the transfer control unit 204.

If the transfer destination is one of the data processing devices 3-11 to 3-13 under control (YES in step S23), the transfer control unit 204 transmits the data packet output from the packet analysis unit 203 to the inter-device communication control unit 205. The inter-device communication control unit 205 confirms the state of the shared bus 6 (step S25 in FIG. 8), and if the shared bus 6 is usable, transfers the data packet sent from the transfer control unit 204 to the data processing device of the transfer destination via the shared bus 6 (step S26 in FIG. 8).

At this time, if packet processing needs to be performed not in the data processing device of the transfer destination but in the data transfer device 2-9 (YES in step S27 in FIG. 8), the data acquisition unit 206 extracts a payload from the data packet sent from the transfer control unit 204, and combines payloads acquired from one or a plurality of data packets with the same user ID, thereby reconstructing original data (step S28 in FIG. 8). Since the order of the packets that have arrived may have been changed, the data acquisition unit 206 performs packet order control based on sequence numbers and arranges the data extracted from the plurality of packets in a correct order.

If a state in which data processing is possible is obtained, the data acquisition unit 206 transfers the reconstructed data to the data processing device of the transfer destination via the shared bus 6 (step S26 in FIG. 8). In addition, the data acquisition unit 206 causes the packet creation unit 207 to save the packet header extracted from the data packet sent from the transfer control unit 204.

Note that which data processing device of the data processing devices 3-11 to 3-13 under control of the data transfer device 2-9 needs packet processing is known, and the information of the data processing device that needs packet processing is registered in the data acquisition unit 206 in advance.

If data processing of the SF is completed, a data packet or data is returned from the data processing device of the transfer destination (YES in step S29 in FIG. 8).

In response to communication requirements from the data processing devices 3-11 to 3-13 under control, the communication management unit 2053 of the inter-device communication control unit 205 of the data transfer device 2-9 gives the use right of the shared bus 6 to one of the data processing devices 3-11 to 3-13 and receives a packet, via the shared bus 6, from the data processing device given the use right (step S30 in FIG. 8).

If the inter-device communication control unit 205 receives a packet from the data processing device under control, the packet analysis unit 203 of the data transfer device 2-9 analyzes the received packet and acquires a tag added to the packet (step S31 in FIG. 8).

If the data sent from the data processing device under control does not have a packet format but is data reconstructed from the packet and needs to be packetized (YES in step S32 in FIG. 8), the packet creation unit 207 of the data transfer device 2-9 packetizes the data by combining the received data and a packet header corresponding to the user ID added to the data received from the data processing device among packet headers received from the data acquisition unit 206 and saved (step S33 in FIG. 8). At this time, if the received data needs to be divided, the packet creation unit 207 packetizes each of the divided data by combining it with the packet header.

If packet processing is performed by the packet creation unit 207, the packet analysis unit 203 analyzes the packet created by the packet creation unit 207 and acquires a tag added to the packet (step S31).

The transfer control unit 2050 of the inter-device communication control unit 205 of the data transfer device 2-9 searches the routing table registered in the self-device using route information described in the tag acquired by the packet analysis unit 203 as a search key, and decides the transfer destination of the packet received from the data processing device under control or the packet created by the packet creation unit 207 (step S34 in FIG. 8).

If the transfer destination is one of the data processing devices 3-11 to 3-13 under control (YES in step S35), the inter-device communication control unit 205 advances to step S25. By the above-described processes of step S25 to S28, the data packet is transferred to the data processing device of the transfer destination via the shared bus 6.

If the transfer destination is not the data processing devices 3-11 to 3-13 under control (NO in step S35), the inter-device communication control unit 205 transfers the packet received from the data processing device under control or the packet created by the packet creation unit 207 to the transfer control unit 204. By the processes of steps S22 to S24, the data packet is transferred to an adjacent data transfer device or an adjacent external transmission apparatus of the transfer destination.

The data transfer device 2-9 repetitively executes the above-described processing until the operation of the data processing system is ended (YES in step S36 in FIG. 8).

Note that in the example shown in FIG. 8, a description has been made using the data transfer device 2-9 as an example. The operation of the data transfer devices 2-1 to 2-8 is the same as the data transfer device 2-9.

Figure 9:
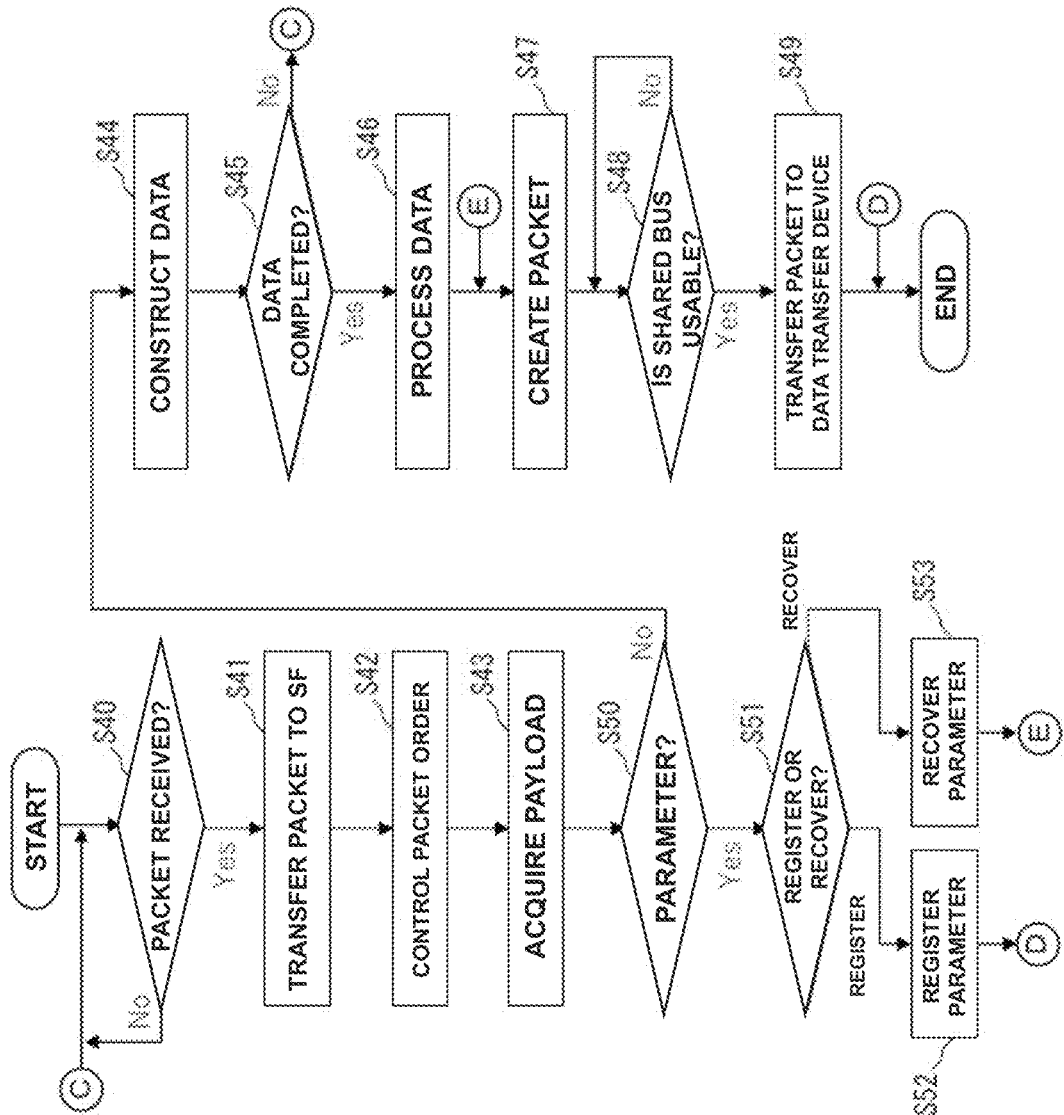
FIG. 9 is a flowchart for explaining the operation of the data processing device according to the embodiment of the present invention.

FIG. 9 is a flowchart for explaining the operation of the data processing devices 3-11. Upon receiving a data packet from the data transfer device 2-9 via the shared bus 6 (YES in step S40 in FIG. 9), the packet distribution unit 301 of the data processing device 3-11 refers to route information described in the tag of the data packet and transfers the data packet to one of the SF units 302-1 to 302-L of the destination (step S41 in FIG. 9).

The packet order control unit 3020 of the SF unit of the transfer destination arranges a plurality of data packets sent from the data transfer device 2-9 in a correct order (step S42 in FIG. 9).

The data acquisition unit 3021 extracts a payload from each of the data packets arranged in the correct order by the packet order control unit 3020 (step S43 in FIG. 9).

The data construction unit 3022 combines the payloads acquired by the data acquisition unit 3021 from the plurality of data packets, thereby reconstructing original data (step S44 in FIG. 9). The processes of steps S40 to S44 are repetitively executed until a data processible state is obtained.

If a data processible state is obtained (YES in step S45 in FIG. 9), the data processing unit 3024 executes predetermined processing for the data received from the data construction unit 3022, and transmits the data after the processing to the packet creation unit 3025 (step S46 in FIG. 9).

The packet creation unit 3025 packetizes the data received from the data processing unit 3024, and transmits the data to the communication requiring unit 300 (step S47 in FIG. 9). Although not explicitly shown in FIG. 9, the data acquisition unit 3021 refers to the route information described in the tag included in the packet header of the data packet and updates the route information described in the tag to exclude the SF unit itself (one of the SF units 302-1 to 302-L) from the route of the service chain. Then, the data acquisition unit 3021 transfers the packet header after tag updating to the packet creation unit 3025. The packet creation unit 3025 packetizes the data received from the data processing unit 3024 by combining it with the packet header received from the data acquisition unit 3021.

Upon receiving the data packet from the packet creation unit 3025, the communication requiring unit 300 of the data processing device 3-11 requests the data transfer device 2-9 of the higher order to use the shared bus 6, and when the use right of the shared bus 6 is given by the data transfer device 2-9 (YES in step S48 in FIG. 9), transmits the data packet to the data transfer device 2-9 (step S49 in FIG. 9).

Note that if the data received in step S40 does not have a packet format but is data reconstructed by the data transfer device 2-9 of the transfer source, the processes of steps S42 to S44 are unnecessary. Also, if the data received in step S40 does not have a packet format but is data reconstructed by the data transfer device 2-9 of the transfer source, the packet header is transmitted from the data transfer device 2-9 together with the data. In this case, the packet creation unit 3025 packetizes the data received from the data processing unit 3024 by combining it with the packet header received from the data transfer device 2-9.

On the other hand, if the data received in step S40 is not a packet of "service use" or data reconstructed from a packet of "service use" but a packet of "parameter registration request" (YES in step S50 in FIG. 9), the register management unit 3023 registers, in the data processing unit 3024, a parameter included in the payload extracted from the packet by the data acquisition unit 3021, and the processing is ended (steps S51 and S52 in FIG. 9).

Also, if the data received in step S40 is not a packet of "service use" or data reconstructed from a packet of "service use" but a packet of "parameter recovery request" (YES in step S50 in FIG. 9), the register management unit 3023 deletes a parameter corresponding to the user ID included in the packet of "parameter recovery request" from the data processing unit 3024. The packet creation unit 3025 packetizes the parameter registered in the data processing unit 3024 and transmits it to the data transfer device 2-9, and the processing is ended (steps S51 and S53 in FIG. 9). At this time, the address of one of the user management apparatuses 1-1 to 1-3 as the transmission source of the packet of "parameter recovery request" is set as a destination address in the header of the packet created by the packet creation unit 3025.

Note that in the example shown in FIG. 9, a description has been made using the data processing device 3-11 as an example. The operation of the data processing devices 3-1 to 3-10, 3-12, and 3-13 is the same as the data processing device 3-11.

Figure 10:
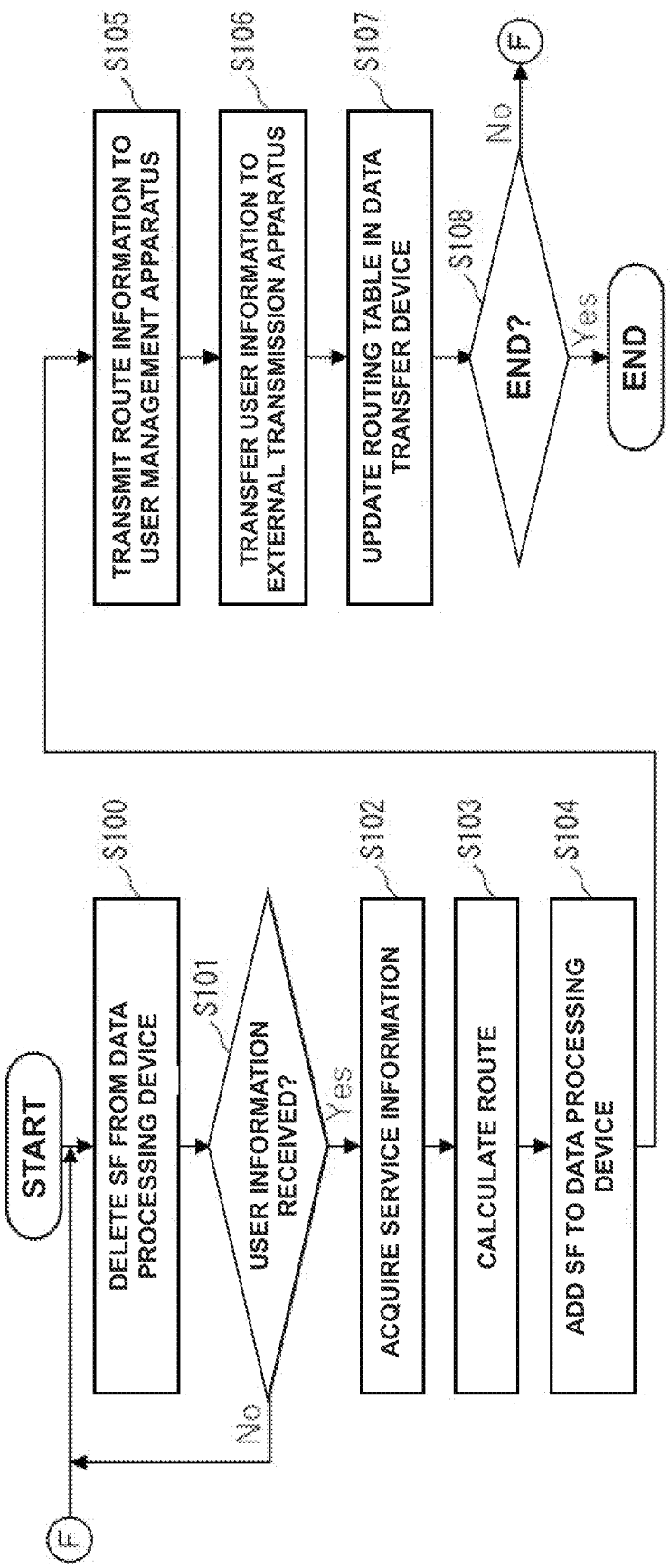
FIG. 10 is a flowchart for explaining the operation of a communication management apparatus according to the embodiment of the present invention.

FIG. 10 is a flowchart for explaining the operation of the communication management apparatus 5. The communication management apparatus 5 cooperates with the user management apparatuses 1-1 to 1-3, receives user information or service use end information, and transmits route information to the user management apparatuses 1-1 to 1-3. Also, the communication management apparatus 5 manages the routing table registered in each of the transfer control units 204 and 2050 of the data transfer devices 2-1 to 2-9, and controls addition/deletion of an SF to/from each of the data processing devices 3-1 to 3-13.

Upon receiving service use end information, the communication management apparatus 5 deletes the SF from a corresponding one of the data processing devices 3-1 to 3-13 (step S100 in FIG. 10). More specifically, if the data processing device is formed by, for example, a CPU or a GPU, the program of the SF is deleted from the memory of the CPU or the GPU. If the data processing device is formed by, for example, an FPGA, the circuit configuration of the FPGA is updated, and the circuit for the SF is deleted. By deleting the SF, power consumption of the data processing system can be reduced.

Upon receiving user information and a user ID from the user management unit 109 of the user management apparatuses 1-1 to 1-3 (YES in step S101 in FIG. 10), the communication management apparatus 5 acquires service information included in the user information (step S102 in FIG. 10).

Based on the acquired service information, the communication management apparatus 5 calculates a route passing through SFs necessary for implementing the service requested by the user (step S103 in FIG. 10). In this calculation, in consideration of the arrangement of SFs under operation, the use band between the data transfer devices 2-1 to 2-9, and the use band in the data transfer devices 2-1 to 2-9, the new service chain is prevented from affecting others. For the route calculation, for example, a classical layout and wiring method such as a maze method or a genetic algorithm can be used.

If there are many services under operation, it may be impossible to implement a new service using only existing SFs. Hence, in some cases, an SF is added to the data processing devices 3-1 to 3-13 under operation stop. If an SF needs to be added, the communication management apparatus 5 adds a desired SF to a data processing device under operation stop, which is located at the position of the desired SF on the route passing through SFs necessary for the new service chain (step S104 in FIG. 10).

If the data processing device is formed by, for example, a CPU or a GPU, the communication management apparatus 5 transfers the program of a predetermined SF to the data processing device and stores it in the memory of the data processing device. If the data processing device is formed by, for example, an FPGA, the communication management apparatus 5 transfers data for updating the circuit configuration of the FPGA to the data processing device and adds a circuit for the desired SF.

If route calculation succeeds, the communication management apparatus 5 transmits the route information and the user ID to a user management apparatus serving as the start point of the calculated route among the user management apparatuses 1-1 to 1-3 (step S105 in FIG. 10). If the route information is transmitted only to the user management apparatus serving as the start point of the route, the user management apparatuses 1-1 to 1-3 can each hold only route information concerning itself in association with the user ID.

In addition, the communication management apparatus 5 transfers the user information and the user ID to an external transmission apparatus serving as the end point of the calculated route among the external transmission apparatuses 4-1 to 4-3 (step S106 in FIG. 10). If the user information is transferred only to the external transmission apparatus serving as the end point of the route, the external transmission apparatuses 4-1 to 4-3 can each hold only user information concerning itself in association with the user ID.

If the user management apparatuses 1-1 to 1-3 and the external transmission apparatuses 4-1 to 4-3 of the transmission destinations accept the information sent from the communication management apparatus 5, the communication management apparatus 5 sends information to the data transfer devices 2-1 to 2-9 on the route to update, based on the result of the route calculation, the routing tables registered in the transfer control units 204 and 2050 of the data transfer devices 2-1 to 2-9 on the calculated route (step S107 in FIG. 10). That is, the routing tables are updated such that the packet of "service use" transmitted from the user who has requested the new service passes through the calculated route. In this embodiment, the routing table updating targets are limited to minimum data transfer devices, thereby suppressing enlargement of the routing tables.

If route calculation fails, or the user management apparatuses 1-1 to 1-3 or the external transmission apparatuses 4-1 to 4-3 of the transmission destination do not accept the information sent from the communication management apparatus 5, the communication management apparatus 5 notifies the user, via the user management apparatuses 1-1 to 1-3, that the service cannot be started.

The communication management apparatus 5 repetitively executes the above-described processing until the operation of the data processing system ends (YES in step S108 in FIG. 10).

FIG. 11 is a sequence chart for explaining an operation of the data processing system according to this embodiment. Before service use, a user who wants to use the data processing system according to this embodiment makes an application to the data processing system for service use using a user terminal 8 of himself/herself (step S200 in FIG. 11).

Upon receiving a packet whose packet type is "service use application" from the user terminal 8, the user information extraction unit 104 of the user management apparatus 1 acquires user information described in the packet. The user management unit 109 of the user management apparatus 1 issues a user ID, and transfers the user information and the user ID to the communication management apparatus 5 (step S201 in FIG. 11).

Upon receiving the user information, the communication management apparatus 5 calculates the route of the service chain based on service information included in the user information, and transmits the route information and the user ID to the user management apparatus 1 serving as the start point of the calculated route among the plurality of user management apparatuses (step S202 in FIG. 11).

Also, the communication management apparatus 5 transmits the user information and the user ID to the external transmission apparatus 4 serving as the end point of the calculated route among the plurality of external transmission apparatuses (step S203 in FIG. 11). Although not illustrated in FIG. 11, the communication management apparatus 5 updates, based on the result of route calculation, the routing table registered in each of the transfer control units 204 and 2050 of the data transfer devices on the calculated route. Thus, the communication management apparatus 5 organizes an environment for the user to use the service.

In response to the packet of "service use application", the user management unit 109 of the user management apparatus 1 returns a packet including the issued user ID to the user terminal 8, thereby notifying the user of the user ID (step S204 in FIG. 11).

At the start of service use, the user for whom the user ID has been issued notifies the data processing system of the start of service use using the user terminal 8 of himself/herself (step S205 in FIG. 11).

Upon receiving the packet of "service use start" from the user terminal 8, the user management unit 109 of the user management apparatus 1 identifies the user based on the user ID added to the packet, and generates a user-specific parameter necessary for data processing in the SF based on the service information included in the user information managed in association with the user ID. The user management unit 109 then transmits the user-specific parameter to the SF units of the data processing devices 3-1 to 3-$n$ (n is an integer of 2 or more) on the route of the service chain based on the route information managed in association with the user ID (step S206 in FIG. 11).

Although the data transfer devices are not illustrated in FIG. 11, the user-specific parameter is packetized as a packet of "parameter registration request" and transmitted from the user management apparatus 1 to the closest data transfer device. Based on the result of packet analysis by the packet analysis unit 203, the transfer control units 204 and 2050 of each data transfer device transfer the packetized parameter to the SF unit of the data processing device connected to the self-device among the SF units of the data processing devices 3-1 to 3-$n$ of the transmission destination of the parameter.

The register management unit 3023 of the SF unit of one of the data processing devices 3-1 to 3-$n$, which has received the packetized parameter, registers the parameter in the data processing unit 3024 in association with the user ID added to the received packet.

To use the service, the user transmits the data packet to the data processing system using the user terminal 8 of himself/herself (step S207 in FIG. 11). The user ID is added to the data packet whose packet type is "service use", which is transmitted from the user terminal 8.

The tag addition unit 107 of the user management apparatus 1 adds, to the packet, a tag corresponding to the user ID added to the packet whose packet type is "service use", which is received from the user terminal 8, and outputs the packet with the tag to the packet transmission unit 101. The packet transmission unit 101 of the user management apparatus 1 transmits the packet output from the tag addition unit 107 to the closest data transfer device (step S208 in FIG. 11).

Although the data transfer devices are not illustrated in FIG. 11, the packet analysis unit 203 of each data transfer device analyzes the received packet and acquires the tag added to the packet. The transfer control units 204 and 2050 of the data transfer device transfer the packet to the SF unit of the data processing device connected to the self-device among the SF units of the data processing devices 3-1 to 3-$n$ on the route of the service chain in accordance with the route information described in the tag acquired by the packet analysis unit 203 (step S209 in FIG. 11).

The SF units of The data processing devices 3-1 to 3-N(SF) each receive a packet from the data transfer device connected to the self-device, and transmit the packet that has undergone processing in the SF to the data transfer device.

In this way, transferring the packet to the SF unit of the data processing device by the data transfer device on the route of the service chain is performed a plurality of times, and the packet that has undergone all data processes is transferred by the data transfer device to the external transmission apparatus 4 serving as the end point of the service chain (step S210 in FIG. 11).

The external transmission apparatus 4 specifies the user of the destination of the packet based on the user ID added to the received packet, and deletes the tag from the packet. Then, based on the user information corresponding to the user ID, the external transmission apparatus 4 returns the packet with the destination information of TCP/IP to the user terminal 8 (step S211 in FIG. 11).

If another user uses the same SF, at the timing of switching the user, the user management unit 109 of the user management apparatus 1 transmits a packet that requests recovery of the parameter specific to the user who has ended service use to the SF units of the data processing devices 3-1 to 3-*n* on the route of the service chain based on the route information managed in association with the user ID of the user. Based on the result of packet analysis by the packet analysis unit 203, the transfer control units 204 and 2050 of each data transfer device transfer the packet of "parameter recovery request" from the user management apparatus 1 to the SF unit of the data processing device connected to the self-device among the SF units of the data processing devices 3-1 to 3-*n* on the route of the service chain.

Upon receiving the packet of "parameter recovery request" from the user management apparatus 1, the register management unit 3023 of the data processing device deletes, from the data processing unit 3024, a parameter corresponding to the user ID included in the packet. The packet creation unit 304 of the data processing device packetizes the parameter registered in the data processing unit 3024, and transmits it to the data transfer device connected to the self-device. The packetized parameter is transferred from the data transfer device to the user management apparatus 1 (step S212 in FIG. 11).

The user management unit 109 of the user management apparatus 1 manages the parameter recovered from the SF units of the data processing devices 3-1 to 3-*n* via the data transfer device in association with the user ID of the user who has ended service use. Also, the user management apparatus 1 notifies the user terminal 8 of the end of service use (step S213 in FIG. 11). The packet indicating the end of service use is transmitted from the user management apparatus 1 to the communication management apparatus 5 as well.

The timing of determining that the system ends service use is when the user notifies that he/she stops service use or when data is not sent for a predetermined time (timeout). In any case, the user terminal 8 is notified of the end of service use. At this time, if a parameter to the user remains in the data processing devices 3-1 to 3-*n* (SF), it is recovered (discarded), and a parameter to the next user is transmitted.

In a case where another user is standing by even during service use of the user, after the service is used for a predetermined time, as the result of QoS control or in response to an instruction from the outside, the service is temporarily interrupted, and the data processing devices 3-1 to 3-*n* (SF) are left to the next user. At this time, the parameter is recovered from the data processing devices 3-1 to 3-*n* (SF), and the parameter for the next user is transmitted. However, the timing of leaving is the timing when data processing is finished. For example, in an image processing service, processing is performed on a frame basis. Hence, after transmission of data of one frame is ended, the process shifts to parameter updating processing.

FIG. 12 is a sequence chart for explaining another operation of the data processing system according to this embodiment. The data processing system according to this embodiment can also provide a service in which no user-specific parameter is used. If no user-specific parameter is used, the processes of steps S206 and S212 described with reference to FIG. 11 are unnecessary. The rest of the processing is the same as in FIG. 11.

An example of a service that does not use a parameter is a network service. For example, a network service such as firewall, Deep Packet Inspection (DPI), or load balancing is assumed to be simultaneously used by a plurality of traffics, and parameter switching is unnecessary.

In a cloud service as well, for example, if the same learning data is used in machine learning, or if the same parameter is usable in image processing, parameter switching is unnecessary, and the service can be handled as a service that does not use a parameter.

The data processing system according to this embodiment can use a general IP network for communication with the user terminal 8. In this case, the data processing system uniquely identifies a user from an IP address and a port number described in a packet received from the user terminal 8, and issues a user ID.

Figure 13A:
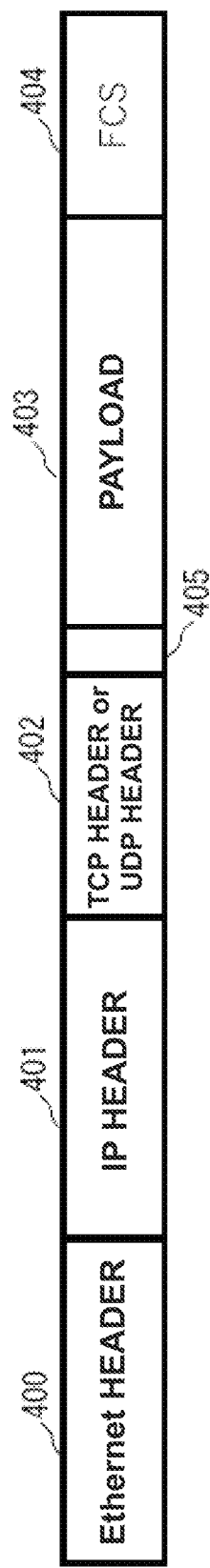
FIG. 13A is a view showing the format of a packet transmitted from a user terminal at the time of service use application.
Figure 13B:
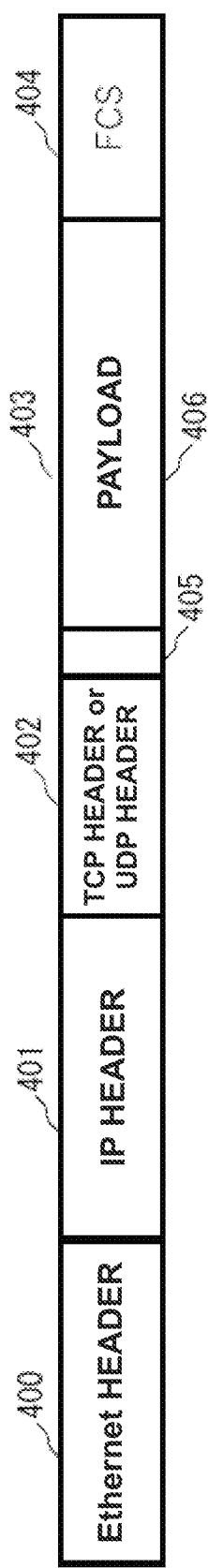
FIG. 13B is a view showing the format of a packet transmitted/received between the user terminal and the data processing system at the time of service use.
Figure 13C:
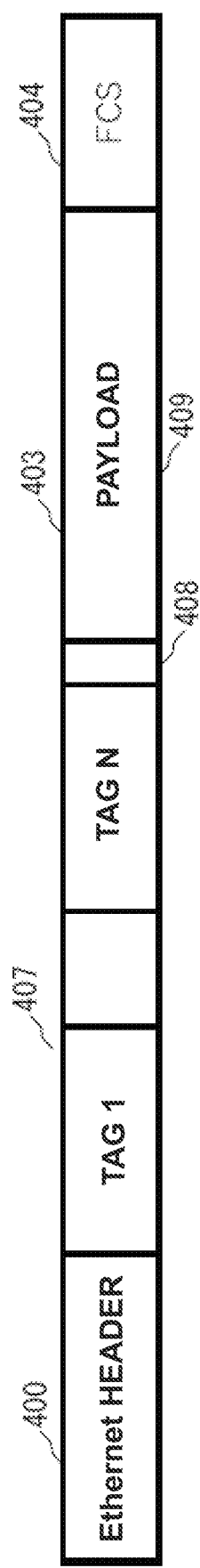
FIG. 13C is a view showing the format of a packet transmitted/received between in the data processing system at the time of service use.

FIG. 13A shows the format of a packet transmitted from the user terminal 8 at the time of service use application, FIG. 13B shows the format of a packet transmitted/received between the user terminal 8 and the data processing system at the time of service use, and FIG. 13C shows the format of a packet transmitted/received between in the data processing system at the time of service use.

The packet of "service use application" includes an Ethernet® header 400, an IP header 401, a TCP header or UDP header 402, a payload 403, and a Frame Check Sequence (FCS) 404.

At the time of service use application, the user terminal 8 stores packet type information indicating "service use application" (a portion 405 in FIG. 13A) in the payload 403 of the packet, and transmits the packet to the data processing system.

As described above, the user management unit 109 of the user management apparatus 1 uniquely identifies the user from a transmission source IP address and a transmission source port number extracted from the packet of "service use application", and issues a user ID. The user management unit 109 returns, to the user terminal 8, a packet in which the issued user ID is stored in the portion 405 in FIG. 13A.

At the time of service use, the user terminal 8 stores the user ID, a sequence number, and packet type information indicating "service use" in the portion indicated by 405 in the payload 403 of the packet shown in FIG. 13B, and stores a data start flag, data, and a data end flag in a portion indicated by 406 in the payload 403. The user terminal 8 transmits the thus generated packet of "service use" to the data processing system. The data start flag, the data end flag, and the sequence number are information necessary for reconstruing data by the data processing device or the data transfer device.

At the time of service use, parameter registration, or parameter recovery, in the data processing system, a packet having the format shown in FIG. 13C is transmitted/received. This packet includes the Ethernet® header 400, a tag 407, the payload 403, and the FCS 404. The user ID, the sequence number, and the packet type information are stored in a portion indicated by 408 in the payload 403, and the data start flag, data, and the data end flag are stored in a portion indicated by 409 in the payload 403. In the data processing system, packet communication using the tag 407 is performed. When route information up to the SF unit of the destination is described in each tag 407, the packet is transferred in accordance with the route information, and data processing is performed in the SF unit corresponding to the service requested by the user.

Figure 14:
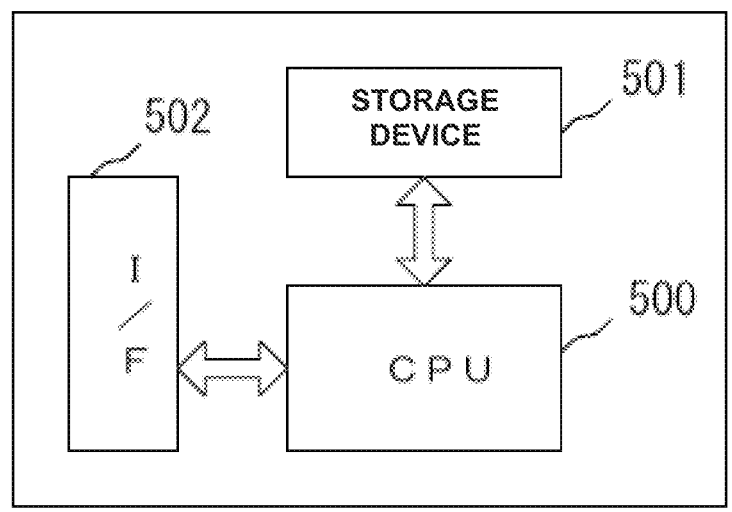
FIG. 14 is a block diagram showing an example of the configuration of a computer that implements the data processing system according to the embodiment of the present invention.

Each of the user management apparatuses 1 and 1-1 to 1-3, the data transfer devices 2-1 to 2-9, the data processing devices 3-1 to 3-13, the external transmission apparatuses 4, 4-1 to 4-3, the communication management apparatus 5, and the user terminal 8 described in this embodiment can be implemented by a computer including a CPU (or a GPU), a storage device, and an interface, and a program that controls these hardware resources. FIG. 14 shows an example of the configuration of the computer. The computer includes a CPU 500 (or a GPU), a storage device 501, and an interface device 502. In such a computer, a program configured to implement a data processing method according to the present invention is stored in the storage device 501. The CPU 500 (or the GPU) of each apparatus executes processing described in this embodiment in accordance with the program stored in the storage device 501.

At least some of the user management apparatuses 1 and 1-1 to 1-3, the data transfer devices 2-1 to 2-9, the data processing devices 3-1 to 3-13, the external transmission apparatuses 4, 4-1 to 4-3, and the communication management apparatus 5 may be formed by an FPGA or an ASIC. In particular, if part of packet processing and data processing is executed by these pieces of hardware, processing performance can be expected to be improved.

Some or all of the above-described embodiments can also be described as in the following supplementary notes but are not limited to the followings.

(Supplementary Note 1) According to the present invention, there is provided a data transfer device having, under control, a data processing device that performs processing of each service function constituting a service chain necessary for implementing a service requested by a user, the data transfer device comprising a plurality of packet reception units each configured to receive a packet from one of a user management apparatus and another data transfer device, which serves as a start point of the service chain; a packet analysis unit configured to acquire a tag from the packet received from one of the user management apparatus, the other data transfer device, and the data processing device under control; an input arbitration unit configured to selectively input a packet from one packet reception unit of the plurality of packet reception units to the packet analysis unit; a first transfer control unit configured to decide, based on route information of the service chain described in the tag, a transfer destination of the packet received from one of the user management apparatus, the other data transfer device, and the data processing device under control; a packet transmission unit configured to, if the transfer destination of the packet is the other data transfer device, transfer the packet to the data transfer device of the transfer destination; and an inter-device communication control unit configured to confirm a state of a shared bus if the transfer destination of the packet is the data processing device, and if the shared bus is usable, transfer the packet to the data processing device of the transfer destination via the shared bus and decide the transfer destination of the packet received from the data processing device under control based on the route information described in the tag, wherein if there exist a plurality of data processing devices under control, the inter-device communication control unit gives a use right of the shared bus to one of the data processing devices in response to communication requirements from the data processing devices, and performs arbitration between the data processing devices such that the packet is received, via the shared bus, from the data processing device given the use right.

(Supplementary Note 2) In the data transfer device according to Supplementary Note 1, the inter-device communication control unit comprises a transmission buffer including a storage unit assigned to each data processing device under control; a second transfer control unit configured to, if the transfer destination of the packet received from the data processing device under control is another data processing device under control, decide the transfer destination of the packet based on the route information described in the tag; a buffer input unit configured to, if the transfer destination of the packet decided by the first transfer control unit or the second transfer control unit is the data processing device under control, store the packet in the storage unit of the transmission buffer corresponding to the data processing device of the transfer destination; and a communication management unit configured to transfer the packet stored in the transmission buffer to the data processing device of the transfer destination via the shared bus and receive the packet from the data processing device, wherein if there exist a plurality of data processing devices under control, the communication management unit gives the use right of the shared bus to one of the data processing devices in response to communication requirements from the data processing devices, and performs arbitration between the data processing devices such that the packet is received, via the shared bus, from the data processing device given the use right.

(Supplementary Note 3) The data transfer device according to Supplementary Note 1 or 2 further comprises a route information registration unit configured to update a routing table registered in each of the first transfer control unit and the inter-device communication control unit based on information from a communication management apparatus that calculates a route of the service chain, wherein each of the first transfer control unit and the inter-device communication control unit decides the transfer destination of the packet based on the route information of the service chain and the routing table registered in itself.

(Supplementary Note 4) The data transfer device according to Supplementary Note 1 or 2 further comprises a data acquisition unit configured to, if the transfer destination of the packet decided by the first transfer control unit or the inter-device communication control unit is the data processing device under control, reconstruct original data before packetization from a payload of the packet and transfer the reconstructed data to the data processing device of the transfer destination via the shared bus, instead of transferring the packet to the data processing device of the transfer destination; and a packet creation unit configured to packetize data received from the data processing device under control, which has undergone data processing of the service function, and transmit the generated packet to the inter-device communication control unit, wherein when extracting data from payloads of a plurality of packets and reconstructing original data, the data acquisition unit performs order control of arranging the data in a correct order.

(Supplementary Note 5) According to the present invention, there is provided a data processing device that performs processing of each service function constituting a service chain necessary for implementing a service requested by a user, the data processing device comprising a plurality of service function units each configured to perform processing of a service function; a packet distribution unit configured to, upon receiving a packet from a data transfer device of a higher order connected by a shared bus, transfer the packet to a service function unit of a transfer destination among the plurality of service function units based on route information of the service chain described in a tag of the packet; and a communication requiring unit configured to, upon receiving the packet that has undergone data processing by the service function unit, require the data transfer device to use the shared bus, and if a use right of the shared bus is given, transfer the packet that has undergone the data processing to the data transfer device, wherein each service function unit comprises a packet order control unit configured to perform order control of arranging the packet received from the data transfer device in a correct order; a data acquisition unit configured to extract a payload from the packet output from the packet order control unit; a data construction unit configured to reconstruct original data before packetization from one or a plurality of payloads output from the data acquisition unit; a data processing unit configured to perform data processing of the service function for the data output from the data construction unit; and a packet creation unit configured to packetize the data that has undergone the data processing by the data processing unit and output the packet to the communication requiring unit.

(Supplementary Note 6) In the data processing device according to Supplementary Note 5, each service function unit further comprises a register management unit configured to, if the received packet is a packet of a parameter registration request, register, in the data processing unit, a parameter included in the payload extracted from the packet by the data acquisition unit, and if the received packet is a packet of a parameter recovery request, delete the parameter from the data processing unit, wherein the packet creation unit packetizes the parameter deleted from the data processing unit such that the packet is returned to a parameter recovery request source, and outputs the packet to the communication requiring unit.

(Supplementary Note 7) According to the present invention, there is provided a data processing method in a data transfer device having, under control, a data processing device that performs processing of each service function constituting a service chain necessary for implementing a service requested by a user, the data processing method comprising a first step of receiving a packet from one of a user management apparatus and another data transfer device, which serves as a start point of the service chain, a second step of analyzing the packet received from one of the user management apparatus and the other data transfer device and acquiring a tag, a third step of deciding, based on route information of the service chain described in the tag acquired in the second step, a transfer destination of the packet received from one of the user management apparatus and the other data transfer device, a fourth step of, if the transfer destination of the packet decided in the third step is the other data transfer device, transferring the packet to the data transfer device of the transfer destination, a fifth step of confirming a state of a shared bus to the data processing device if the transfer destination of the packet decided in the third step is the data processing device under control, a sixth step of, if the shared bus is usable as a result of the confirmation, transferring the packet to the data processing device of the transfer destination via the shared bus, a seventh step of receiving the packet from the data processing device under control, an eighth step of analyzing the packet received from the data processing device under control and acquiring a tag, and a ninth step of deciding the transfer destination of the packet received from the data processing device under control based on the route information described in the tag acquired in the eighth step, wherein the fifth step includes a step of confirming the state of the shared bus to the data processing device if the transfer destination of the packet decided in the ninth step is the data processing device under control, and the seventh step includes a step of, if there exist a plurality of data processing devices under control, giving a use right of the shared bus to one of the data processing devices in response to communication requirements from the data processing devices, and receiving the packet, via the shared bus, from the data processing device given the use right.

(Supplementary Note 8) According to the present invention, there is provided a data processing method in a data processing device that performs processing of each service function constituting a service chain necessary for implementing a service requested by a user, the data processing method comprising a first step of receiving a packet from a data transfer device of a higher order connected by a shared bus, a second step of transferring, based on route information of the service chain described in a tag of the packet received from the data transfer device, the packet to a service function unit of a transfer destination among a plurality of service function units each configured to perform processing of a service function, a third step of performing, in the service function unit of the transfer destination, order control of arranging the received packet in a correct order, a fourth step of extracting a payload from the packet arranged in the correct order in the third step in the service function unit of the transfer destination, a fifth step of reconstructing original data before packetization from one or a plurality of payloads in the service function unit of the transfer destination, a sixth step of performing data processing of a service function for the data reconstructed in the service function unit of the transfer destination, a seventh step of packetizing the data that has undergone the data processing in the sixth step in the service function unit of the transfer destination, an eighth step of, upon receiving the packet that has undergone data processing by the service function unit of the transfer destination, requiring the data transfer device to use the shared bus, and a ninth step of, if a use right of the shared bus is given in response to the requirement, transferring the packet that has undergone the data processing to the data transfer device.

INDUSTRIAL APPLICABILITY

The present invention can be applied to a service function chaining technique.

EXPLANATION OF THE REFERENCE NUMERALS AND SIGNS 1-1-1-3 . . . user management apparatus, 2-1-2-9 . . . data transfer device, 3-1-3-13 . . . data processing device, 4-1-4-3 . . . external transmission apparatus, 5 . . . communication management apparatus, 6 . . . shared bus, 8 . . . user terminal, 100 . . . packet reception unit, 101 . . . packet transmission unit, 102 . . . packet analysis unit, 103 . . . packet type determination unit, 104 . . . user information extraction unit, 105 . . . data management unit, 106 . . . storage unit, 107 . . . tag addition unit, 108 . . . data communication control unit, 109 . . . user management unit, 110 . . . . QoS control unit, 111 . . . tag generation unit, 200-1-200-M . . . packet reception unit, 201 . . . input arbitration unit, 202-1-202-J . . . packet transmission unit, 203 . . . packet analysis unit, 204 . . . transfer control unit 204, 205 . . . inter-device communication control unit, 206 . . . data acquisition unit, 207 . . . packet creation unit, 208 . . . route information registration unit, 300 . . . communication requiring unit, 301 . . . packet distribution unit, 302-1-302-L . . . service function unit, 1050 . . . packet distribution unit, 1051-1-1051-N . . . user determination unit, 1052-1-1052-N . . . user selection unit, 1053-1-1053-N . . . output selection unit, 1054 . . . output control unit, 1055-1-1055-N . . . memory controller, 2050 . . . transfer control unit, 2051 . . . buffer input unit, 2052 . . . transmission buffer, 2053 . . . communication management unit, 2054-1-2054-K . . . storage unit, 3020 . . . packet order control unit, 3021 . . . data acquisition unit, 3022 . . . data construction unit, 3023 . . . register management unit, 3024 . . . data processing unit, 3025 . . . packet creation unit.

The invention claimed is:

1. A data transfer device configured to communicate with a data processing device, under control, that performs processing of each service function constituting a service chain necessary for implementing a service requested by a user, the data transfer device comprising:
a plurality of packet reception circuits each configured to receive a packet from one of a user management apparatus and an other data transfer device, which serves as a start point of the service chain;
a packet analysis circuit configured to acquire a tag from the packet received from one of the user management apparatus, the other data transfer device, and the data processing device under control;
an input arbitration circuit configured to selectively input a packet from one packet reception circuit of the plurality of packet reception circuits to the packet analysis circuit;
a first transfer control circuit configured to decide, based on route information of the service chain described in the tag, a transfer destination of the packet received from one of the user management apparatus, the other data transfer device, and the data processing device under control;
a packet transmission circuit configured to, if the transfer destination of the packet is the other data transfer device, transfer the packet to the data transfer device of the transfer destination; and
an inter-device communication control circuit configured to confirm a state of a shared bus if the transfer destination of the packet is the data processing device, and if the shared bus is usable, transfer the packet to the data processing device of the transfer destination via the shared bus and decide the transfer destination of the packet received from the data processing device under control based on route information described in the tag,
wherein if there exist a plurality of data processing devices under control, the inter-device communication control circuit gives a use right of the shared bus to one of the data processing devices in response to communication requirements from the data processing devices, and performs arbitration between the data processing devices such that the packet is received, via the shared bus, from the data processing device given the use right.

2. The data transfer device according to claim 1, wherein the inter-device communication control circuit comprises:
a transmission buffer including a storage device assigned to each data processing device under control;
a second transfer control circuit configured to, if the transfer destination of the packet received from the data processing device under control is another data processing device under control, decide the transfer destination of the packet based on route information described in the tag;
a buffer input circuit configured to, if the transfer destination of the packet decided by the first transfer control circuit or the second transfer control circuit is the data processing device under control, store the packet in a storage circuit of the transmission buffer corresponding to the data processing device of the transfer destination; and
a communication management circuit configured to transfer the packet stored in the transmission buffer to the data processing device of the transfer destination via the shared bus and receive the packet from the data processing device,
wherein if there exist a plurality of data processing devices under control, the communication management circuit gives the use right of the shared bus to one of the data processing devices in response to communication requirements from the data processing devices, and performs arbitration between the data processing devices such that the packet is received, via the shared bus, from the data processing device given the use right.

3. The data transfer device according to claim 2, further comprising a route information registration circuit configured to update a routing table registered in each of the first transfer control circuit and the inter-device communication control circuit based on information from a communication management apparatus that calculates a route of the service chain,
wherein each of the first transfer control circuit and the inter-device communication control circuit decides the transfer destination of the packet based on the route information of the service chain and the routing table registered in itself.

4. The data transfer device according to claim 2, further comprising:
a data acquisition circuit configured to, if the transfer destination of the packet decided by the first transfer control circuit or the inter-device communication control circuit is the data processing device under control, reconstruct original data before packetization from a payload of the packet and transfer the reconstructed data to the data processing device of the transfer destination via the shared bus, instead of transferring the packet to the data processing device of the transfer destination; and a packet creation circuit configured to packetize data received from the data processing device under control, which has undergone data processing of the service function, and transmit the packetized data to the inter-device communication control circuit, wherein when extracting data from payloads of a plurality of packets and reconstructing original data, the data acquisition circuit performs order control of arranging the data in a correct order.

5. The data transfer device according to claim 1, further comprising a route information registration circuit configured to update a routing table registered in each of the first transfer control circuit and the inter-device communication control circuit based on information from a communication management apparatus that calculates a route of the service chain, wherein each of the first transfer control circuit and the inter-device communication control circuit decides the transfer destination of the packet based on route information of the service chain and the routing table registered in itself.

6. The data transfer device according to claim 5, further comprising:

a data acquisition circuit configured to, if the transfer destination of the packet decided by the first transfer control circuit or the inter-device communication control circuit is the data processing device under control, reconstruct original data before packetization from a payload of the packet and transfer the reconstructed data to the data processing device of the transfer destination via the shared bus, instead of transferring the packet to the data processing device of the transfer destination; and a packet creation circuit configured to packetize data received from the data processing device under control, which has undergone data processing of the service function, and transmit the packetized data to the inter-device communication control circuit, wherein when extracting data from payloads of a plurality of packets and reconstructing original data, the data acquisition circuit performs order control of arranging the data in a correct order.

7. The data transfer device according to claim 1, further comprising:

a data acquisition circuit configured to, if the transfer destination of the packet decided by the first transfer control circuit or the inter-device communication control circuit is the data processing device under control, reconstruct original data before packetization from a payload of the packet and transfer the reconstructed data to the data processing device of the transfer destination via the shared bus, instead of transferring the packet to the data processing device of the transfer destination; and a packet creation circuit configured to packetize data received from the data processing device under control, which has undergone data processing of the service function, and transmit the packetized data to the inter-device communication control circuit, wherein when extracting data from payloads of a plurality of packets and reconstructing original data, the data acquisition circuit performs order control of arranging the data in a correct order.

8. The data transfer device of claim 1, wherein at least one or all of the packet reception circuits, the packet analysis circuit, the input arbitration circuit, the first transfer control circuit, the packet transmission circuit, and the inter-device communication control circuit, comprises at least one processor performing instructions that are stored on a transitory computer readable storage medium.

9. The data transfer device of claim 1, wherein at least one or all of the packet reception circuits, the packet analysis circuit, the input arbitration circuit, the first transfer control circuit, the packet transmission circuit, and the inter-device communication control circuit, comprises an FPGA or an ASIC.

10. A data processing device that performs processing of each service function constituting a service chain necessary for implementing a service requested by a user, the data processing device comprising:

a plurality of service function circuits each configured to perform processing of a service function;

a packet distribution circuit configured to, upon receiving a packet from a data transfer device of a higher order connected by a shared bus, transfer the packet to a service function circuit of a transfer destination among the plurality of service function circuits based on route information of the service chain described in a tag of the packet; and a communication requiring circuit configured to, upon receiving the packet that has undergone data processing by the service function circuit, require the data transfer device to use the shared bus, and if a use right of the shared bus is given, transfer the packet that has undergone the data processing to the data transfer device, wherein each service function circuit comprises:

a packet order control circuit configured to perform order control of arranging the packet received from the data transfer device in a correct order;

a data acquisition circuit configured to extract a payload from the packet output from the packet order control circuit;

a data construction circuit configured to reconstruct original data before packetization from one or a plurality of payloads output from the data acquisition circuit;

a data processing circuit configured to perform data processing of the service function for the data output from the data construction circuit; and a packet creation circuit configured to packetize the data that has undergone the data processing by the data processing circuit and output the packet to the communication requiring circuit.

11. The data processing device according to claim 10, wherein each service function circuit further comprises:

a register management circuit configured to, if the received packet is a packet of a parameter registration request, register, in the data processing circuit, a parameter included in the payload extracted from the packet by the data acquisition circuit, and if the received packet is a packet of a parameter recovery request, delete the parameter from the data processing circuit, wherein the packet creation circuit packetizes the parameter deleted from the data processing circuit such that the packet is returned to a parameter recovery request source, and outputs the packet to the communication requiring circuit.

12. A data processing method in a data transfer device having, under control, a data processing device that performs processing of each service function constituting a service chain necessary for implementing a service requested by a user, the data processing method comprising:
receiving a packet from one of a user management apparatus and an other data transfer device, which serves as a start point of the service chain;
analyzing the packet received from one of the user management apparatus and the other data transfer device and acquiring a tag;
deciding, based on route information of the service chain described in the tag acquired by analyzing the packet received from one of the user management apparatus and the other data transfer device, a transfer destination of the packet received from one of the user management apparatus and the other data transfer device;
if the transfer destination of the packet decided is the other data transfer device, transferring the packet to the data transfer device of the transfer destination;
confirming a state of a shared bus to the data processing device if the transfer destination of the packet decided is the data processing device under control;
if the shared bus is determined to be usable as a result of the confirmation, transferring the packet to the data processing device of the transfer destination via the shared bus;
receiving the packet from the data processing device under control;
analyzing the packet received from the data processing device under control and acquiring a tag; and
deciding the transfer destination of the packet received from the data processing device under control based on route information described in the tag acquired by analyzing the packet received from the data processing device under control,
wherein confirming the state of the shared bus includes confirming the state of the shared bus to the data processing device if the transfer destination of the packet decided is the data processing device under control, and
receiving the packet from the data processing device under control includes, if there exist a plurality of data processing devices under control, giving a use right of the shared bus to one of the data processing devices in response to communication requirements from the data processing devices, and receiving the packet, via the shared bus, from the data processing device given the use right.

13. A data processing method in a data processing device that performs processing of each service function constituting a service chain necessary for implementing a service requested by a user, the data processing method comprising:
receiving a packet from a data transfer device of a higher order connected by a shared bus;
transferring, based on route information of the service chain described in a tag of the packet received from the data transfer device, the packet to a service function circuit of a transfer destination among a plurality of service function circuits each configured to perform processing of a service function;
performing, in the service function circuit of the transfer destination, order control of arranging the received packet in a correct order;
extracting a payload from the packet arranged in the correct order in the service function circuit of the transfer destination;
reconstructing original data before packetization from one or a plurality of payloads in the service function circuit of the transfer destination;
performing data processing of a service function for the data reconstructed in the service function circuit of the transfer destination;
packetizing the data that has undergone the data processing of the service function for the data reconstructed in the service function circuit of the transfer destination;
upon receiving the packet that has undergone data processing by the service function circuit of the transfer destination, requiring the data transfer device to use the shared bus; and
if a use right of the shared bus is given in response to the requirement, transferring the packet that has undergone the data processing to the data transfer device.

14. A data processing device containing non-transitory computer-readable media containing instructions that, when executed by the data processing device, cause the data processing device to perform instructions to perform processing of each service function constituting a service chain necessary for implementing a service requested by a user, the instructions comprising:
receive a packet from one of a user management apparatus and an other data transfer device, which serves as a start point of the service chain;
analyze the packet received from one of the user management apparatus and the other data transfer device and acquiring a tag;
decide, based on route information of the service chain described in the tag acquired by analyzing the packet received from one of the user management apparatus and the other data transfer device, a transfer destination of the packet received from one of the user management apparatus and the other data transfer device;
if the transfer destination of the packet decided is the other data transfer device, transferring the packet to the data transfer device of the transfer destination;
confirm a state of a shared bus to the data processing device if the transfer destination of the packet decided is the data processing device under control;
if the shared bus is determined to be usable as a result of the confirmation, transferring the packet to the data processing device of the transfer destination via the shared bus;
receive the packet from the data processing device under control;
analyze the packet received from the data processing device under control and acquiring a tag; and
decide the transfer destination of the packet received from the data processing device under control based on route information described in the tag acquired by analyzing the packet received from the data processing device under control,
wherein confirming the state of the shared bus includes confirming the state of the shared bus to the data processing device if the transfer destination of the packet decided is the data processing device under control, and
receive the packet from the data processing device under control includes, if there exist a plurality of data processing devices under control, giving a use right of the shared bus to one of the data processing devices in response to communication requirements from the data processing devices, and receiving the packet, via the shared bus, from the data processing device given the use right.

\* \* \* \* \*